US007058670B2

(12) United States Patent
Garthwaite

(10) Patent No.: US 7,058,670 B2
(45) Date of Patent: Jun. 6, 2006

(54) SCALABLE, SPACE-EFFICIENT, PARALLEL REMEMBERED-SETS

(75) Inventor: Alexander T. Garthwaite, Beverly, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 423 days.

(21) Appl. No.: 10/325,049

(22) Filed: Dec. 20, 2002

(65) Prior Publication Data

US 2004/0122875 A1 Jun. 24, 2004

(51) Int. Cl.
*G06F 17/30* (2006.01)
(52) U.S. Cl. .......................................... 707/206; 707/1
(58) Field of Classification Search .................... 707/1, 707/2, 3, 4, 5, 6, 7, 8, 9, 10, 100, 101, 102, 707/103, 104.1, 206; 711/170–173, 200–204; 719/312–315; 709/312; 717/140, 116, 158
See application file for complete search history.

(56) References Cited

U.S. PATENT DOCUMENTS

| 6,185,581 | B1 * | 2/2001 | Garthwaite | 707/206 |
|---|---|---|---|---|
| 6,363,403 | B1 * | 3/2002 | Roy et al. | 707/206 |
| 6,381,738 | B1 * | 4/2002 | Choi et al. | 717/140 |
| 6,424,977 | B1 * | 7/2002 | Garthwaite | 707/206 |
| 6,490,599 | B1 * | 12/2002 | Kolodner et al. | 707/206 |
| 6,826,757 | B1 * | 11/2004 | Steele et al. | 719/314 |
| 6,845,437 | B1 * | 1/2005 | Borman et al. | 711/173 |
| 6,868,488 | B1 * | 3/2005 | Garthwaite | 711/173 |

OTHER PUBLICATIONS

Jones and Lins, "Garbage Collection: Algorithms for Automatic Dynamic Memory Management," 1996, pp. 165-179, Wiley, New York.

Paul Wilson, "Uniprocessor Garbage Collection Techniques," Technical Report, University of Texas, 1994.

Hudson and Moss, "Incremental Collection of Mature Objects," Proceedings of International Workshop on Memory Management, 1992, Springer-Verlag.

Grarup and Seligmann, "Incremental Mature Garbage Collection," M.Sc. Thesis, Available at http://www.daimi.au.dk/~jacobse/Papers/.

Seligmann and Grarup, "Incremental Mature Garbage Collection Using the Train Algorithm," Proceedings of ECOOP '95, Ninth European Conference on Object-Oriented Programming, 1995, http://www.daimi.au.dk/~jacobse/Papers/.

(Continued)

*Primary Examiner*—Apu Mofit
*Assistant Examiner*—Yicun Wu
(74) *Attorney, Agent, or Firm*—Kudirka & Jobse, LLP

(57) ABSTRACT

A garbage collector operates in increments in which it collects a collection set consisting of one or more segments of a dynamically allocated heap. For each of those segments it maintains a remembered set of locations in which it has previously found references to objects in that associated segment. Each remembered set is stored in a plurality of remembered-set structures, each of which is associated with a separate one of a corresponding plurality of "stripes" into which at least a portion of the heap is divided. The garbage collector executes its remembered-set-updating operations in a plurality of concurrently executing threads, each of which claims exclusive access to a subset of the constituent remembered-set structures. By restricting its access only to that subset of the remembered-set structures that it has claimed, an individual thread is able to perform its portion of the updating operation without the need for synchronization with other threads.

22 Claims, 23 Drawing Sheets

OTHER PUBLICATIONS

Clark and Mason, "Compacting Garbage Collection can be Fast and Simple," Software-Practice and Experience, Feb. 1996, pp. 177-194, vol. 26, No. 2.

Henry Baker, "List Processing in Real Time on a Serial Computer," Communications of the ACM 21, Apr. 4, 1978, pp. 280-294.

Appel, Ellis, and Li, "Real-time Concurrent Collection on Stock Multiprocessors," ACM SIGPLAN Notices, 1988.

Rodney A. Brooks, "Trading Data Space for Reduced Time and Code Space in Real-Time Garbage Collection on Stock Hardware," Proceedings of the 1984 ACM Symposium on Lisp and Functional Programming, pp. 108-113, Aug. 1984. Austin, Texas.

Herilhy and Moss, "Lock-Free Garbage Collection for Multiprocessors," ACM SPAA, 1991, pp. 229-236.

Bacon, Attanasio, Lee, Rajan, and Smith, "Java without the Coffee Breaks: A Nonintrusive Multiprocessor Garbage Collector," SIGPLAN Conference on Programming Language Design and Implementation, Snowbird, Utah, Jun. 2001.

James Stamos, "Static Grouping of Small Objects to Enhance Performance of a Paged Virtual Memory," ACM Transactions on Computer Systems, vol. 2, No. 2, pp. 155-180, May 1984.

David A. Moon, "Garbage Collection in a Large Lisp System," Conference Record of the 1984 ACM Symposium on Lisp and Funstional Programming, Austin, Texas, Aug. 1984, pp. 235-246.

Robert Courts, "Improving Locality of Reference in a Garbage-Collecting Memory Management System," Communications of the ACM, Sep. 1988, pp. 1128-1138, vol. 31, No. 9.

Wilson, Lam, and Moher, "Effective Static-Graph Reorganization to Improve Locality in Garbage Collected Systems," Proceedings of ACM SIGPLAN Conference on Programming Language Design and Implementation, Jun. 1991, Toronto, Ontario, Canada.

Lam, Wilson, and Moher, "Object Type Directed Garbage Collection to Improve Locality," Proceedings of the International Workshop on Memory Management '92, St. Malo, France, Sep. 1992, pp. 404-425.

Chilimbi and Larus, "Using Generational Garbage Collection to Implement Cache-Conscious Data Placement," International Symposium on Memory Management, Oct. 1998.

Lieberman and Hewitt, "A real-time garbage collector based on the lifetimes of objects," Communications of the ACM, 1983, pp. 419-429, vol. 26, No. 6.

David Ungar, "Generation Scavenging: A Non-Disruptive High Performance Storage Reclamation Algorithm," ACM SIGPLAN Notices, Apr. 1984, pp. 157-167, vol. 19, No. 5.

Andrew W. Appel, "Simple Generational Garbage Collection and Fast Allocation," Software Practice and Experience, 1989, pp. 171-183, vol. 19, No. 2.

Hudson and Diwan, "Adaptive Garbage Collection for Modula-3 and Smalltalk," in OOPSLA/ECOOP Workshop on Garbage Collection in Object-Oriented Systems, Oct. 1990, Edited by Eric Jul and Niels-Cristial Juul.

Hudson and Hosking, "Remembered sets can also play cards," in OOPSLA/ECOOP Workshop on Garbage Collection in Object-Oriented System, Oct. 1993, Edited by Moss, Wilson, and Zorn.

Hosking and Moss, "Protection traps and alternatives for memory management of an object-oriented language," ACM Proceedings of the Fourteenth ACM Symposium on Operating Systems Principles, Dec. 1993, pp. 106-119, vol. 27, No. 5.

Hosking, Moss, and Stefanovic, "A Comparative Performance Evaluation of Write Barrier Implementation," in OOPSLA ACM Conference on Object-Oriented Programming, Systems, Languages, and Applications, Oct. 1992, pp. 92-109, vol. 27, No. 10, ACM SIGPLAN Notices, Vancouver, BC, ACM Press.

Patrick G. Sobalvarro, "A Lifetime-based Garbage Collector for Lisp Systems on General-Purpose Computers," Massachusetts Institute of Technology, AITR-1417, 1988.

* cited by examiner

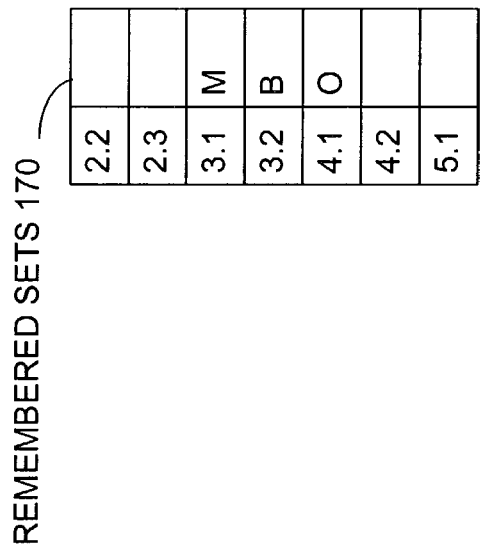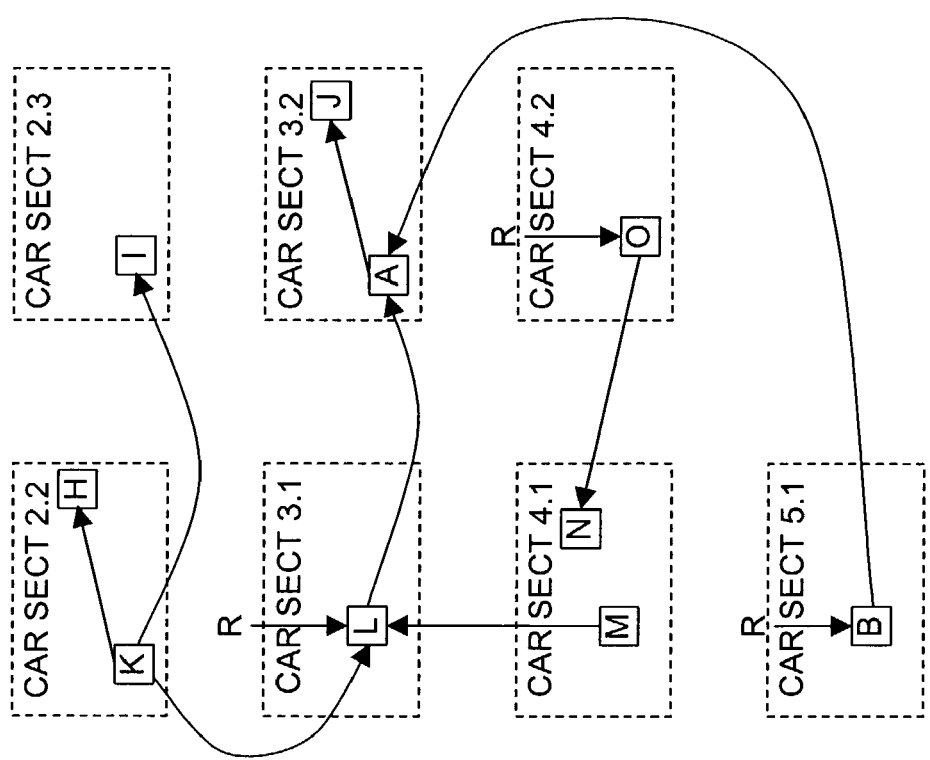
FIG. 12F

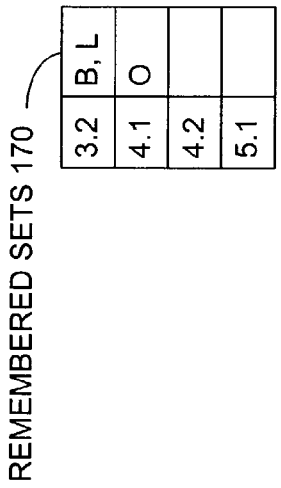
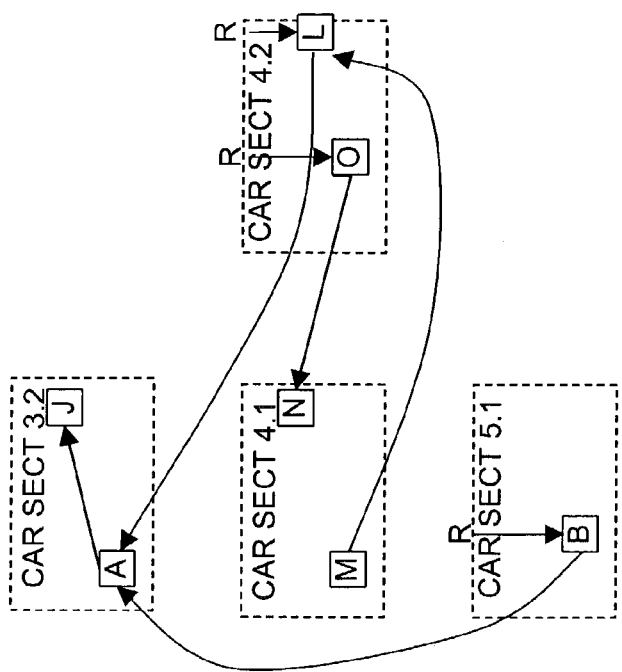
FIG. 12G
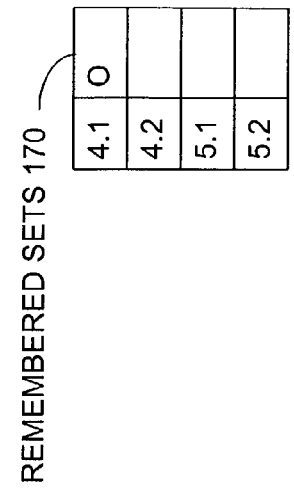
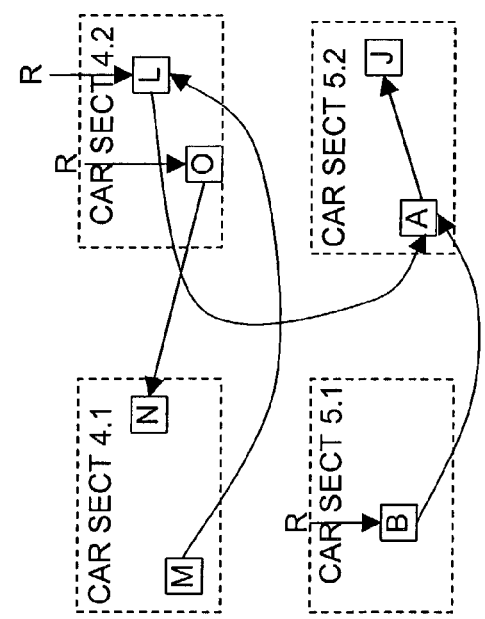
FIG. 12H

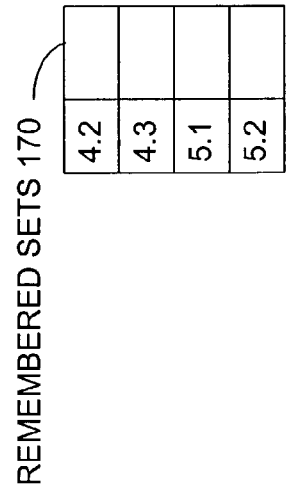
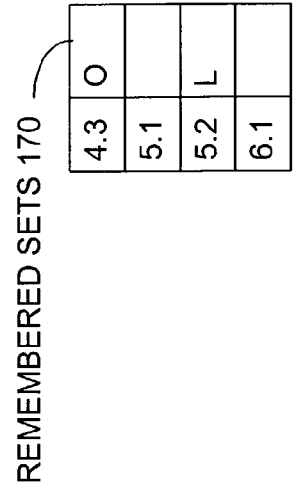
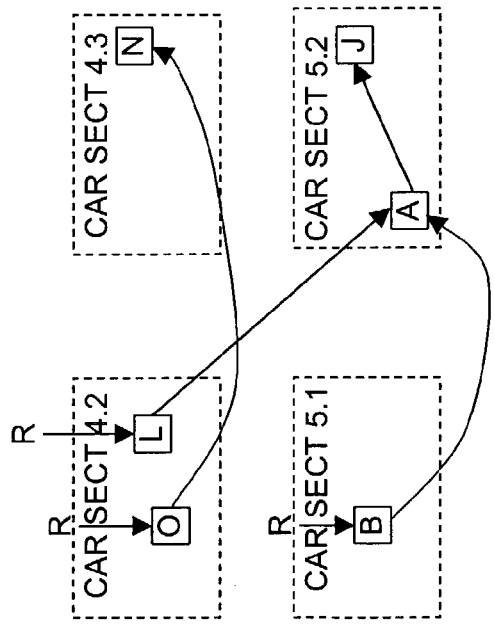
FIG. 12I
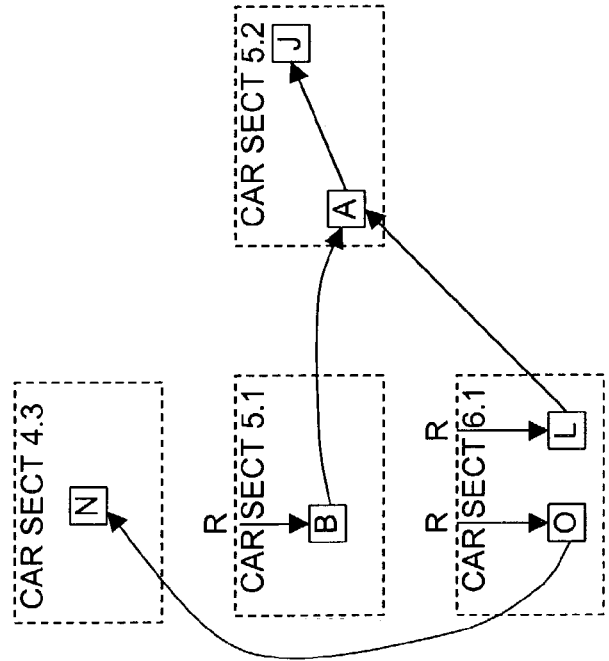
FIG. 12J

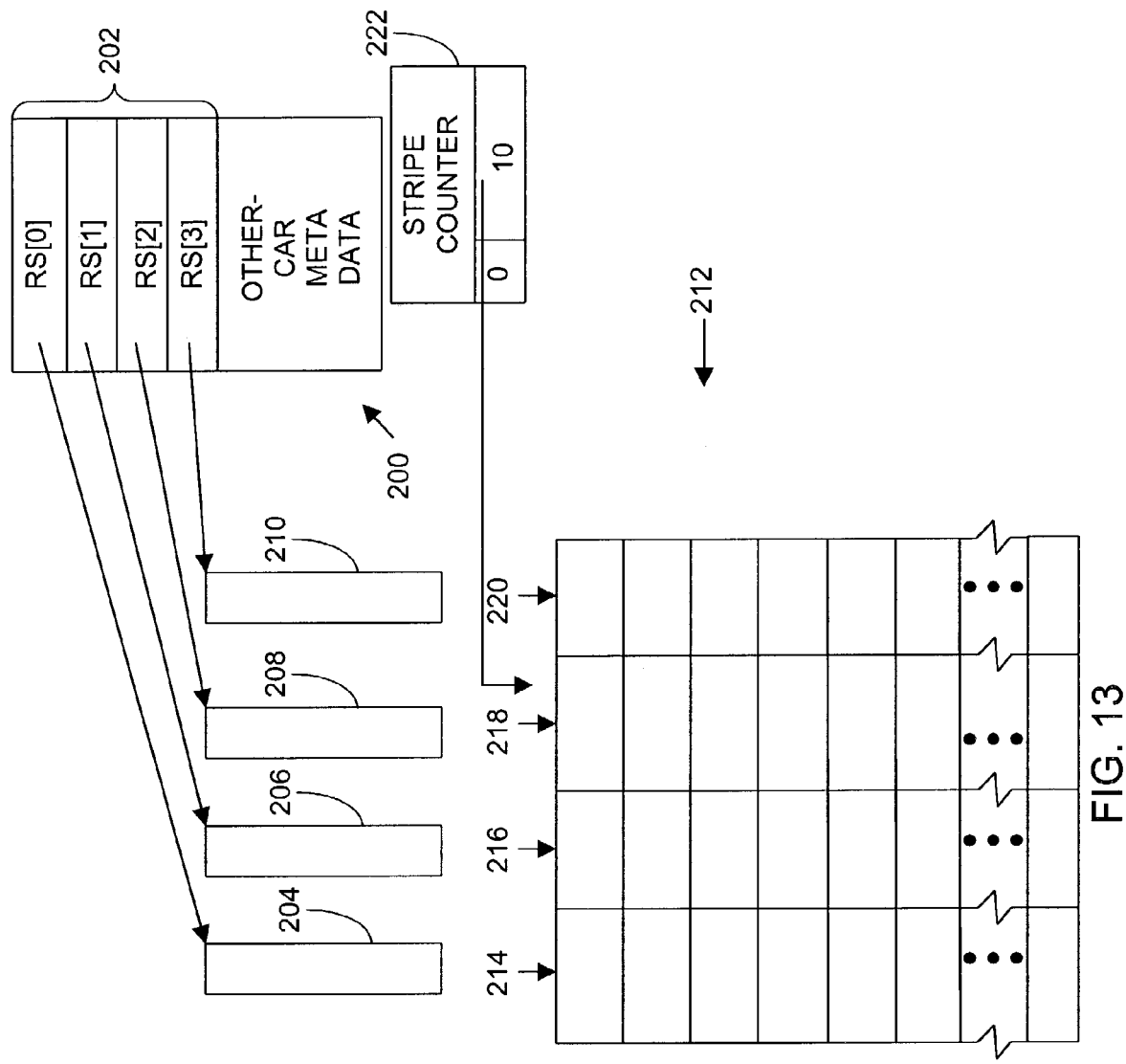

SCALABLE, SPACE-EFFICIENT, PARALLEL REMEMBERED-SETS

BACKGROUND OF THE INVENTION

1. Field of the Invention

The present invention is directed to memory management. It particularly concerns what has come to be known as "garbage collection."

2. Background Information

In the field of computer systems, considerable effort has been expended on the task of allocating memory to data objects. For the purposes of this discussion, the term object refers to a data structure represented in a computer system's memory. Other terms sometimes used for the same concept are record and structure. An object may be identified by a reference, a relatively small amount of information that can be used to access the object. A reference can be represented as a "pointer" or a "machine address," which may require, for instance, only sixteen, thirty-two, or sixty-four bits of information, although there are other ways to represent a reference.

In some systems, which are usually known as "object oriented," objects may have is associated methods, which are routines that can be invoked by reference to the object. They also may belong to a class, which is an organizational entity that may contain method code or other information shared by all objects belonging to that class. In the discussion that follows, though, the term object will not be limited to such structures; it will additionally include structures with which methods and classes are not associated.

The invention to be described below is applicable to systems that allocate memory to objects dynamically. Not all systems employ dynamic allocation. In some computer languages, source programs must be so written that all objects to which the program's variables refer are bound to storage locations at compile time. This storage-allocation approach, sometimes referred to as "static allocation," is the policy traditionally used by the Fortran programming language, for example.

Even for compilers that are thought of as allocating objects only statically, of course, there is often a certain level of abstraction to this binding of objects to storage locations. Consider the typical computer system 10 depicted in FIG. 1, for example. Data, and instructions for operating on them, that a microprocessor 11 uses may reside in on-board cache memory or be received from further cache memory 12, possibly through the mediation of a cache controller 13. That controller 13 can in turn receive such data from system read/write memory ("RAM") 14 through a RAM controller 15 or from various peripheral devices through a system bus 16. The memory space made available to an application program may be "virtual" in the sense that it may actually be considerably larger than RAM 14 provides. So the RAM contents will be swapped to and from a system disk 17.

Additionally, the actual physical operations performed to access some of the most-recently visited parts of the process's address space often will actually be performed in the cache 12 or in a cache on board microprocessor 11 rather than on the RAM 14, with which those caches swap data and instructions just as RAM 14 and system disk 17 do with each other.

A further level of abstraction results from the fact that an application will often be run as one of many processes operating concurrently with the support of an underlying operating system. As part of that system's memory management, the application's memory space may be moved among different actual physical locations many times in order to allow different processes to employ shared physical memory devices. That is, the location specified in the application's machine code may actually result in different physical locations at different times because the operating system adds different offsets to the machine-language-specified location.

Despite these expedients, the use of static memory allocation in writing certain long-lived applications makes it difficult to restrict storage requirements to the available memory space. Abiding by space limitations is easier when the platform provides for dynamic memory allocation, i.e., when memory space to be allocated to a given object is determined only at run time.

Dynamic allocation has a number of advantages, among which is that the run-time system is able to adapt allocation to run-time conditions. For example, the programmer can specify that space should be allocated for a given object only in response to a particular run-time condition. The C-language library function malloc( ) is often used for this purpose. Conversely, the programmer can specify conditions under which memory previously allocated to a given object can be reclaimed for reuse. The C-language library function free( ) results in such memory reclamation.

Because dynamic allocation provides for memory reuse, it facilitates generation of large or long-lived applications, which over the course of their lifetimes may employ objects whose total memory requirements would greatly exceed the available memory resources if they were bound to memory locations statically.

Particularly for long-lived applications, though, allocation and reclamation of dynamic memory must be performed carefully. If the application fails to reclaim unused memory—or, worse, loses track of the address of a dynamically allocated segment of memory—its memory requirements will grow over time to exceed the system's available memory. This kind of error is known as a "memory leak."

Another kind of error occurs when an application reclaims memory for reuse even though it still maintains a reference to that memory. If the reclaimed memory is reallocated for a different purpose, the application may inadvertently manipulate the same memory in multiple inconsistent ways. This kind of error is known as a "dangling reference," because an application should not retain a reference to a memory location once that location is reclaimed. Explicit dynamic-memory management by using interfaces like malloc( )/free( ) often leads to these problems.

A way of reducing the likelihood of such leaks and related errors is to provide memory-space reclamation in a more-automatic manner. Techniques used by systems that reclaim memory space automatically are commonly referred to as "garbage collection." Garbage collectors operate by reclaiming space that they no longer consider "reachable." Statically allocated objects represented by a program's global variables are normally considered reachable throughout a program's life. Such objects are not ordinarily stored in the garbage collector's managed memory space, but they may contain references to dynamically allocated objects that are, and such objects are considered reachable. Clearly, an object referred to in the processor's call stack is reachable, as is an object referred to by register contents. And an object referred to by any reachable object is also reachable.

The use of garbage collectors is advantageous because, whereas a programmer working on a particular sequence of code can perform his task creditably in most respects with only local knowledge of the application at any given time, memory allocation and reclamation require a global knowledge of the program. Specifically, a programmer dealing with a given sequence of code does tend to know whether some portion of memory is still in use for that sequence of code, but it is considerably more difficult for him to know what the rest of the application is doing with that memory. By tracing references from some conservative notion of a "root set," e.g., global variables, registers, and the call stack, automatic garbage collectors obtain global knowledge in a methodical way. By using a garbage collector, the programmer is relieved of the need to worry about the application's global state and can concentrate on local-state issues, which are more manageable. The result is applications that are more robust, having no dangling references and fewer memory leaks.

Garbage-collection mechanisms can be implemented by various parts and levels of a computing system. One approach is simply to provide them as part of a batch compiler's output. Consider FIG. 2's simple batch-compiler operation, for example. A computer system executes in accordance with compiler object code and therefore acts as a compiler 20. The compiler object code is typically stored on a medium such as FIG. 1's system disk 17 or some other machine-readable medium, and it is loaded into RAM 14 to configure the computer system to act as a compiler. In some cases, though, the compiler object code's persistent storage may instead be provided in a server system remote from the machine that performs the compiling. The electrical signals that carry the digital data by which the computer systems exchange that code are examples of the kinds of electromagnetic signals by which the computer instructions can be communicated. Others are radio waves, microwaves, and both visible and invisible light.

The input to the compiler is the application source code, and the end product of the compiler process is application object code. This object code defines an application 21, which typically operates on input such as mouse clicks, etc., to generate a display or some other type of output. This object code implements the relationship that the programmer intends to specify by his application source code. In one approach to garbage collection, the compiler 20, without the programmer's explicit direction, additionally generates code that automatically reclaims unreachable memory space.

Even in this simple case, though, there is a sense in which the application does not itself provide the entire garbage collector. Specifically, the application will typically call upon the underlying operating system's memory-allocation functions. And the operating system may in turn take advantage of various hardware that lends itself particularly to use in garbage collection. So even a very simple system may disperse the garbage-collection mechanism over a number of computer-system layers.

To get some sense of the variety of system components that can be used to implement garbage collection, consider FIG. 3's example of a more complex way in which various levels of source code can result in the machine instructions that a processor executes. In the FIG. 3 arrangement, the human applications programmer produces source code 22 written in a high-level language. A compiler 23 typically converts that code into "class files." These files include routines written in instructions, called "byte codes" 24, for a "virtual machine" that various processors can be software-configured to emulate. This conversion into byte codes is almost always separated in time from those codes' execution, so FIG. 3 divides the sequence into a "compile-time environment" 25 separate from a "run-time environment" 26, in which execution occurs. One example of a high-level language for which compilers are available to produce such virtual-machine instructions is the Java™ programming language. (Java is a trademark or registered trademark of Sun Microsystems, Inc., in the United States and other countries.)

Most typically, the class files' byte-code routines are executed by a processor under control of a virtual-machine process 27. That process emulates a virtual machine from whose instruction set the byte codes are drawn. As is true of the compiler 23, the virtual-machine process 27 may be specified by code stored on a local disk or some other machine-readable medium from which it is read into FIG. 1's RAM 14 to configure the computer system to implement the garbage collector and otherwise act as a virtual machine. Again, though, that code's persistent storage may instead be provided by a server system remote from the processor that implements the virtual machine, in which case the code would be transmitted electrically or optically to the virtual-machine-implementing processor.

In some implementations, much of the virtual machine's action in executing these byte codes is most like what those skilled in the art refer to as "interpreting," so FIG. 3 depicts the virtual machine as including an "interpreter" 28 for that purpose. In addition to or instead of running an interpreter, many virtual-machine implementations actually compile the byte codes concurrently with the resultant object code's execution, so FIG. 3 depicts the virtual machine as additionally including a "just-in-time" compiler 29. We will refer to the just-in-time compiler and the interpreter together as "execution engines" since they are the methods by which byte code can be executed.

Now, some of the functionality that source-language constructs specify can be quite complicated, requiring many machine-language instructions for their implementation. One quite-common example is a source-language instruction that calls for 64-bit arithmetic on a 32-bit machine. More germane to the present invention is the operation of dynamically allocating space to a new object; the allocation of such objects must be mediated by the garbage collector.

In such situations, the compiler may produce "inline" code to accomplish these operations. That is, all object-code instructions for carrying out a given source-code-prescribed operation will be repeated each time the source code calls for the operation. But inlining runs the risk that "code bloat" will result if the operation is invoked at many source-code locations.

The natural way of avoiding this result is instead to provide the operation's implementation as a procedure, i.e., a single code sequence that can be called from any location in the program. In the case of compilers, a collection of procedures for implementing many types of source-code-specified operations is called a runtime system for the language. The execution engines and the runtime system of a virtual machine are designed together so that the engines "know" what runtime-system procedures are available in the virtual machine (and on the target system if that system provides facilities that are directly usable by an executing virtual-machine program.) So, for example, the just-in-time compiler 29 may generate native code that includes calls to memory-allocation procedures provided by the virtual machine's runtime system. These allocation routines may in turn invoke garbage-collection routines of the runtime system when there is not enough memory available to satisfy an allocation. To represent this fact, FIG. 3 includes block 30 to show that the compiler's output makes calls to the runtime system as well as to the operating system 31, which consists of procedures that are similarly system-resident but are not compiler-dependent.

Although the FIG. 3 arrangement is a popular one, it is by no means universal, and many further implementation types can be expected. Proposals have even been made to implement the virtual machine 27's behavior in a hardware processor, in which case the hardware itself would provide some or all of the garbage-collection function.

The arrangement of FIG. 3 differs from FIG. 2 in that the compiler 23 for converting the human programmer's code does not contribute to providing the garbage-collection function; that results largely from the virtual machine 27's operation. Those skilled in that art will recognize that both of these organizations are merely exemplary, and many modem systems employ hybrid mechanisms, which partake of the characteristics of traditional compilers and traditional interpreters both.

The invention to be described below is applicable independently of whether a batch compiler, a just-in-time compiler, an interpreter, or some hybrid is employed to process source code. In the remainder of this application, therefore, we will use the term compiler to refer to any such mechanism, even if it is what would more typically be called an interpreter.

In short, garbage collectors can be implemented in a wide range of combinations of hardware and/or software. As is true of most of the garbage-collection techniques described in the literature, the invention to be described below is applicable to most such systems.

By implementing garbage collection, a computer system can greatly reduce the occurrence of memory leaks and other software deficiencies in which human programming frequently results. But it can also have significant adverse performance effects if it is not implemented carefully. To distinguish the part of the program that does "useful" work from that which does the garbage collection, the term mutator is sometimes used in discussions of these effects; from the collector's point of view, what the mutator does is mutate active data structures' connectivity.

Some garbage-collection approaches rely heavily on interleaving garbage-collection steps among mutator steps. In one type of garbage-collection approach, for instance, the mutator operation of writing a reference is followed immediately by garbage-collector steps used to maintain a reference count in that object's header, and code for subsequent new-object storage includes steps for finding space occupied by objects whose reference count has fallen to zero. Obviously, such an approach can slow mutator operation significantly.

Other approaches therefore interleave very few garbage-collector-related instructions into the main mutator process but instead interrupt it from time to time to perform garbage-collection cycles, in which the garbage collector finds unreachable objects and reclaims their memory space for reuse. Such an approach will be assumed in discussing FIG. 4's depiction of a simple garbage-collection operation. Within the memory space allocated to a given application is a part 40 managed by automatic garbage collection. In the following discussion, this will be referred to as the "heap," although in other contexts that term refers to all dynamically allocated memory. During the course of the application's execution, space is allocated for various objects 42, 44, 46, 48, and 50. Typically, the mutator allocates space within the heap by invoking the garbage collector, which at some level manages access to the heap. Basically, the mutator asks the garbage collector for a pointer to a heap region where it can safely place the object's data. The garbage collector keeps track of the fact that the thus-allocated region is occupied. It will refrain from allocating that region in response to any other request until it determines that the mutator no longer needs the region allocated to that object.

Garbage collectors vary as to which objects they consider reachable and unreachable. For the present discussion, though, an object will be considered "reachable" if it is referred to, as object 42 is, by a reference in the root set 52. The root set consists of reference values stored in the mutator's threads' call stacks, the CPU registers, and global variables outside the garbage-collected heap. An object is also reachable if it is referred to, as object 46 is, by another reachable object (in this case, object 42). Objects that are not reachable can no longer affect the program, so it is safe to re-allocate the memory spaces that they occupy.

A typical approach to garbage collection is therefore to identify all reachable objects and reclaim any previously allocated memory that the reachable objects do not occupy. A typical garbage collector may identify reachable objects by tracing references from the root set 52. For the sake of simplicity, FIG. 4 depicts only one reference from the root set 52 into the heap 40. (Those skilled in the art will recognize that there are many ways to identify references, or at least data contents that may be references.) The collector notes that the root set points to object 42, which is therefore reachable, and that reachable object 42 points to object 46, which therefore is also reachable. But those reachable objects point to no other objects, so objects 44, 48, and 50 are all unreachable, and their memory space may be reclaimed. This may involve, say, placing that memory space in a list of free memory blocks.

To avoid excessive heap fragmentation, some garbage collectors additionally relocate reachable objects. FIG. 5 shows a typical approach. The heap is partitioned into two halves, hereafter called "semi-spaces." For one garbage-collection cycle, all objects are allocated in one semi-space 54, leaving the other semi-space 56 free. When the garbage-collection cycle occurs, objects identified as reachable are "evacuated" to the other semi-space 56, so all of semi-space 54 is then considered free. Once the garbage-collection cycle has occurred, all new objects are allocated in the lower semi-space 56 until yet another garbage-collection cycle occurs, at which time the reachable objects are evacuated back to the upper semi-space 54.

Although this relocation requires the extra steps of copying the reachable objects and updating references to them, it tends to be quite efficient, since most new objects quickly become unreachable, so most of the current semi-space is actually garbage. That is, only a relatively few, reachable objects need to be relocated, after which the entire semi-space contains only garbage and can be pronounced free for reallocation.

Now, a collection cycle can involve following all reference chains from the basic root set—i.e., from inherently reachable locations such as the call stacks, class statics and other global variables, and registers—and reclaiming all space occupied by objects not encountered in the process. And the simplest way of performing such a cycle is to interrupt the mutator to provide a collector interval in which the entire cycle is performed before the mutator resumes. For certain types of applications, this approach to collection-cycle scheduling is acceptable and, in fact, highly efficient.

For many interactive and real-time applications, though, this approach is not acceptable. The delay in mutator operation that the collection cycle's execution causes can be annoying to a user and can prevent a real-time application from responding to its environment with the required speed. In some applications, choosing collection times opportunistically can reduce this effect. Collection intervals can be inserted when an interactive mutator reaches a point at which it awaits user input, for instance.

So it may often be true that the garbage-collection operation's effect on performance can depend less on the total collection time than on when collections actually occur. But another factor that often is even more determinative is the duration of any single collection interval, i.e., how long the mutator must remain quiescent at any one time. In an interactive system, for instance, a user may never notice hundred-millisecond interruptions for garbage collection, whereas most users would find interruptions lasting for two seconds to be annoying.

The cycle may therefore be divided up among a plurality of collector intervals. When a collection cycle is divided up among a plurality of collection intervals, it is only after a number of intervals that the collector will have followed all reference chains and be able to identify as garbage any objects not thereby reached. This approach is more complex than completing the cycle in a single collection interval; the mutator will usually modify references between collection intervals, so the collector must repeatedly update its view of the reference graph in the midst of the collection cycle. To make such updates practical, the mutator must communicate with the collector to let it know what reference changes are made between intervals.

An even more complex approach, which some systems use to eliminate discrete pauses or maximize resource-use efficiency, is to execute the mutator and collector in concurrent execution threads. Most systems that use this approach use it for most but not all of the collection cycle; the mutator is usually interrupted for a short collector interval, in which a part of the collector cycle takes place without mutation.

Independent of whether the collection cycle is performed concurrently with mutator operation, is completed in a single interval, or extends over multiple intervals is the question of whether the cycle is complete, as has tacitly been assumed so far, or is instead "incremental." In incremental collection, a collection cycle constitutes only an increment of collection: the collector does not follow all reference chains from the basic root set completely. Instead, it concentrates on only a portion, or collection set, of the heap. Specifically, it identifies every collection-set object referred to by a reference chain that extends into the collection set from outside of it, and it reclaims the collection-set space not occupied by such objects, possibly after evacuating them from the collection set.

By thus culling objects referenced by reference chains that do not necessarily originate in the basic root set, the collector can be thought of as expanding the root set to include as roots some locations that may not be reachable. Although incremental collection thereby leaves "floating garbage," it can result in relatively low pause times even if entire collection increments are completed during respective single collection intervals.

Most collectors that employ incremental collection operate in "generations," although this is not necessary in principle. Different portions, or generations, of the heap are subject to different collection policies. New objects are allocated in a "young" generation, and older objects are promoted from younger generations to older or more "mature" generations. Collecting the younger generations more frequently than the others yields greater efficiency because the younger generations tend to accumulate garbage faster; newly allocated objects tend to "die," while older objects tend to "survive."

But generational collection greatly increases what is effectively the root set for a given generation. Consider FIG. 6, which depicts a heap as organized into three generations 58, 60, and 62. Assume that generation 60 is to be collected. The process for this individual generation may be more or less the same as that described in connection with FIGS. 4 and 5 for the entire heap, with one major exception. In the case of a single generation, the root set must be considered to include not only the call stack, registers, and global variables represented by set 52 but also objects in the other generations 58 and 62, which themselves may contain references to objects in generation 60. So pointers must be traced not only from the basic root set 52 but also from objects within the other generations.

One could perform this tracing by simply inspecting all references in all other generations at the beginning of every collection interval, and it turns out that this approach is actually feasible in some situations. But it takes too long in other situations, so workers in this field have employed a number of approaches to expediting reference tracing. One approach is to include so-called write barriers in the mutator process. A write barrier is code added to a write operation to record information from which the collector can determine where references were written or may have been since the last collection interval. A reference list can then be maintained by taking such a list as it existed at the end of the previous collection interval and updating it by inspecting only locations identified by the write barrier as possibly modified since the last collection interval.

One of the many write-barrier implementations commonly used by workers in this art employs what has been referred to as the "card table." FIG. 6 depicts the various generations as being divided into smaller sections, known for this purpose as "cards." Card tables 64, 66, and 68 associated with respective generations contain an entry for each of their cards. When the mutator writes a reference in a card, it makes an appropriate entry in the card-table location associated with that card (or, say, with the card in which the object containing the reference begins). Most write-barrier implementations simply make a Boolean entry indicating that the write operation has been performed, although some may be more elaborate. The mutator having thus left a record of where new or modified references may be, the collector can thereafter prepare appropriate summaries of that information, as will be explained in due course. For the sake of concreteness, we will assume that the summaries are maintained by steps that occur principally at the beginning of each collection interval.

Of course, there are other write-barrier approaches, such as simply having the write barrier add to a list of addresses where references where written. Also, although there is no reason in principle to favor any particular number of generations, and although FIG. 6 shows three, most generational garbage collectors have only two generations, of which one is the young generation and the other is the mature generation. Moreover, although FIG. 6 shows the generations as being of the same size, a more-typical configuration is for the young generation to be considerably smaller. Finally, although we assumed for the sake of simplicity that collection during a given interval was limited to only one generation, a more-typical approach is actually to collect the whole young generation at every interval but to collect the mature one less frequently.

Some collectors collect the entire young generation in every interval and may thereafter perform mature-generation collection in the same interval. It may therefore take relatively little time to scan all young-generation objects remaining after young-generation collection to find references into the mature generation. Even when such collectors do not use card tables, therefore, they often do not use them for finding young-generation references that refer to mature-generation objects. On the other hand, laboriously scanning the entire mature generation for references to young-generation (or mature-generation) objects would ordinarily take too long, so the collector uses the card table to limit the amount of memory it searches for mature-generation references.

Now, although it typically takes very little time to collect the young generation, it may take more time than is acceptable within a single garbage-collection cycle to collect the entire mature generation. So some garbage collectors may collect the mature generation incrementally; that is, they may perform only a part of the mature generation's collection during any particular collection cycle. Incremental collection presents the problem that, since the generation's unreachable objects outside the "collection set" of objects processed during that cycle cannot be recognized as unreachable, collection-set objects to which they refer tend not to be, either.

To reduce the adverse effect this would otherwise have on collection efficiency, workers in this field have employed the "train algorithm," which FIG. 7 depicts. A generation to be collected incrementally is divided into sections, which for reasons about to be described are referred to as "car sections." Conventionally, a generation's incremental collection occurs in fixed-size sections, and a car section's size is that of the generation portion to be collected during one cycle.

The discussion that follows will occasionally employ the nomenclature in the literature by using the term car instead of car section. But the literature seems to use that term to refer variously not only to memory sections themselves but also to data structures that the train algorithm employs to manage them when they contain objects, as well as to the more-abstract concept that the car section and managing data structure represent in discussions of the algorithm. So the following discussion will more frequently use the expression car section to emphasize the actual sections of memory space for whose management the car concept is employed.

According to the train algorithm, the car sections are grouped into "trains," which are ordered, conventionally according to age. For example, FIG. 7 shows an oldest train 73 consisting of a generation 74's three car sections described by associated data structures 75, 76, and 78, while a second train 80 consists only of a single car section, represented by structure 82, and the youngest train 84 (referred to as the "allocation train") consists of car sections that data structures 86 and 88 represent. As will be seen below, car sections' train memberships can change, and any car section added to a train is typically added to the end of a train.

Conventionally, the car collected in an increment is the one added earliest to the oldest train, which in this case is car 75. All of the generation's cars can thus be thought of as waiting for collection in a single long line, in which cars are ordered in accordance with the order of the trains to which they belong and, within trains, in accordance with the order in which they were added to those trains.

As is usual, the way in which reachable objects are identified is to determine whether there are references to them in the root set or in any other object already determined to be reachable. In accordance with the train algorithm, the collector additionally performs a test to determine whether there are any references at all from outside the oldest train to objects within it. If there are not, then all cars within the train can be reclaimed, even though not all of those cars are in the collection set. And the train algorithm so operates that inter-car references tend to be grouped into trains, as will now be explained.

To identify references into the car from outside of it, train-algorithm implementations typically employ "remembered sets." As card tables are, remembered sets are used to keep track of references. Whereas a card-table entry contains information about references that the associated card contains, though, a remembered set associated with a given region contains information about references into that region from locations outside of it. In the case of the train algorithm, remembered sets are associated with car sections. Each remembered set, such as car 75's remembered set 90, lists locations in the generation that contain references into the associated car section.

The remembered sets for all of a generation's cars are typically updated at the start of each collection cycle. To illustrate how such updating and other collection operations may be carried out, FIGS. 8A and 8B (together, "FIG. 8") depict an operational sequence in a system of the typical type mention above. That is, it shows a sequence of operations that may occur in a system in which the entire garbage-collected heap is divided into two generations, namely, a young generation and an old generation, and in which the young generation is much smaller than the old generation. FIG. 8 is also based on the assumption and that the train algorithm is used only for collecting the old generation.

Block 102 represents a period of the mutator's operation. As was explained above, the mutator makes a card-table entry to identify any card that it has "dirtied" by adding or modifying a reference that the card contains. At some point, the mutator will be interrupted for collector operation. Different implementations employ different events to trigger such an interruption, but we will assume for the sake of concreteness that the system's dynamic-allocation routine causes such interruptions when no room is left in the young generation for any further allocation. A dashed line 103 represents the transition from mutator operation and collector operation.

In the system assumed for the FIG. 8 example, the collector collects the (entire) young generation each time such an interruption occurs. When the young generation's collection ends, the mutator operation usually resumes, without the collector's having collected any part of the old generation. Once in a while, though, the collector also collects part of the old generation, and FIG. 8 is intended to illustrate such an occasion.

When the collector's interval first starts, it first processes the card table, in an operation that block 104 represents. As was mentioned above, the collector scans the "dirtied" cards for references into the young generation. If a reference is found, that fact is recorded appropriately. If the reference refers to a young-generation object, for example, an expanded card table may be used for this purpose. For each card, such an expanded card table might include a multi-byte array used to summarize the card's reference contents. The summary may, for instance, be a list of offsets that indicate the exact locations within the card of references to young-generation objects, or it may be a list of fine-granularity "sub-cards" within which references to young-generation objects may be found. If the reference refers to an old-generation object, the collector often adds an entry to the remembered set associated with the car containing that old-generation object. The entry identifies the reference's location, or at least a small region in which the reference can be found. For reasons that will become apparent, though, the collector will typically not bother to place in the remembered set the locations of references from objects in car sections farther forward in the collection queue than the referred-to object, i.e., from objects in older trains or in cars added earlier to the same train.

The collector then collects the young generation, as block 105 indicates. (Actually, young-generation collection may be interleaved with the dirty-region scanning, but the drawing illustrates it for purpose of explanation as being separate.) If a young-generation object is referred to by a reference that card-table scanning has revealed, that object is considered to be potentially reachable, as is any young-generation object referred to by a reference in the root set or in another reachable young-generation object. The space occupied by any young-generation object thus considered reachable is withheld from reclamation. For example, it may be evacuated to a young-generation semi-space that will be used for allocation during the next mutator interval. It may instead be promoted into the older generation, where it is placed into a car containing a reference to it or into a car in the last train. Or some other technique may be used to keep the memory space it occupies off the system's free list. The collector then reclaims any young-generation space occupied by any other objects, i.e., by any young-generation objects not identified as transitively reachable through references located outside the young generation.

The collector then performs the train algorithm's central test, referred to above, of determining whether there are any references into the oldest train from outside of it. As was mentioned above, the actual process of determining, for each object, whether it can be identified as unreachable is performed for only a single car section in any cycle. In the absence of features such as those provided by the train algorithm, this would present a problem, because garbage structures may be larger than a car section. Objects in such structures would therefore (erroneously) appear reachable, since they are referred to from outside the car section under consideration. But the train algorithm additionally keeps track of whether there are any references into a given car from outside the train to which it belongs, and trains' sizes are not limited. As will be apparent presently, objects not found to be unreachable are relocated in such a way that garbage structures tend to be gathered into respective trains into which, eventually, no references from outside the train point. If no references from outside the train point to any objects inside the train, the train can be recognized as containing only garbage. This is the test that block 106 represents. All cars in a train thus identified as containing only garbage can be reclaimed.

The question of whether old-generation references point into the train from outside of it is (conservatively) answered in the course of updating remembered sets; in the course of updating a car's remembered set, it is a simple matter to flag the car as being referred to from outside the train. The step-106 test additionally involves determining whether any references from outside the old generation point into the oldest train. Various approaches to making this determination have been suggested, including the conceptually simple approach of merely following all reference chains from the root set until those chains (1) terminate, (2) reach an old-generation object outside the oldest train, or (3) reach an object in the oldest train. In the two-generation example, most of this work can be done readily by identifying references into the collection set from live young-generation objects during the young-generation collection. If one or more such chains reach the oldest train, that train includes reachable objects. It may also include reachable objects if the remembered-set-update operation has found one or more references into the oldest train from outside of it. Otherwise, that train contains only garbage, and the collector reclaims all of its car sections for reuse, as block 107 indicates. The collector may then return control to the mutator, which resumes execution, as FIG. 8B's block 108 indicates.

If the train contains reachable objects, on the other hand, the collector turns to evacuating potentially reachable objects from the collection set. The first operation, which block 110 represents, is to remove from the collection set any object that is reachable from the root set by way of a reference chain that does not pass through the part of the old generation that is outside of the collection set. In the illustrated arrangement, in which there are only two generations, and the young generation has previously been completely collected during the same interval, this means evacuating from a collection set any object that (1) is directly referred to by a reference in the root set, (2) is directly referred to by a reference in the young generation (in which no remaining objects have been found unreachable), or (3) is referred to by any reference in an object thereby evacuated. All of the objects thus evacuated are placed in cars in the youngest train, which was newly created during the collection cycle. Certain of the mechanics involved in the evacuation process are described in more detail in connection with similar evacuation performed, as blocks 112 and 114 indicate, in response to remembered-set entries.

FIG. 9 illustrates how the processing represented by block 114 proceeds. The entries identify heap regions, and, as block 116 indicates, the collector scans the thus-identified heap regions to find references to locations in the collection-set. As blocks 118 and 120 indicate, that entry's processing continues until the collector finds no more such references. Every time the collector does find such a reference, it checks to determine whether, as a result of a previous entry's processing, the referred-to object has already been evacuated. If it has not, the collector evacuates the referred-to object to a (possibly new) car in the train containing the reference, as blocks 122 and 124 indicate.

As FIG. 10 indicates, the evacuation operation includes more than just object relocation, which block 126 represents. Once the object has been moved, the collector places a forwarding pointer in the collection-set location from which it was evacuated, for a purpose that will become apparent presently. Block 128 represents that step. (Actually, there are some cases in which the evacuation is only a "logical" evacuation: the car containing the object is simply re-linked to a different logical place in the collection sequence, but its address does not change. In such cases, forwarding pointers are unnecessary.) Additionally, the reference in response to which the object was evacuated is updated to point to the evacuated object's new location, as block 130 indicates. And, as block 132 indicates, any reference contained in the evacuated object is processed, in an operation that FIGS. 11A and 11B (together, "FIG. 11") depict.

For each one of the evacuated object's references, the collector checks to see whether the location that it refers to is in the collection set. As blocks 134 and 136 indicate, the reference processing continues until all references in the evacuated object have been processed. In the meantime, if a reference refers to a collection-set location that contains an object not yet evacuated, the collector evacuates the referred-to object to the train to which the evacuated object containing the reference was evacuated, as blocks 138 and 140 indicate.

If the reference refers to a location in the collection set from which the object has already been evacuated, then the collector uses the forwarding pointer left in that location to update the reference, as block 142 indicates. Before the processing of FIG. 11, the remembered set of the referred-to object's car will have an entry that identifies the evacuated object's old location as one containing a reference to the referred-to object. But the evacuation has placed the reference in a new location, for which the remembered set of the referred-to object's car may not have an entry. So, if that new location is not as far forward as the referred-to object, the collector adds to that remembered set an entry identifying the reference's new region, as blocks 144 and 146 indicate. As the drawings show, the same type of remembered-set update is performed if the object referred to by the evacuated reference is not in the collection set.

Now, some train-algorithm implementations postpone processing of the references contained in evacuated collection-set objects until after all directly reachable collection-set objects have been evacuated. In the implementation that FIG. 10 illustrates, though, the processing of a given evacuated object's references occurs before the next object is evacuated. So FIG. 11's blocks 134 and 148 indicate that the FIG. 11 operation is completed when all of the references contained in the evacuated object have been processed. This completes FIG. 10's object-evacuation operation, which FIG. 9's block 124 represents.

As FIG. 9 indicates, each collection-set object referred to by a reference in a remembered-set-entry-identified location is thus evacuated if it has not been already. If the object has already been evacuated from the referred-to location, the reference to that location is updated to point to the location to which the object has been evacuated. If the remembered set associated with the car containing the evacuated object's new location does not include an entry for the reference's location, it is updated to do so if the car containing the reference is younger than the car containing the evacuated object. Block 150 represents updating the reference and, if necessary, the remembered set.

As FIG. 8's blocks 112 and 114 indicate, this processing of collection-set remembered sets is performed initially only for entries that do not refer to locations in the oldest train. Those that do are processed only after all others have been, as blocks 152 and 154 indicate.

When this process has been completed, the collection set's memory space can be reclaimed, as block 164 indicates, since no remaining object is referred to from outside the collection set: any remaining collection-set object is unreachable. The collector then relinquishes control to the mutator.

FIGS. 12A–12J illustrate results of using the train algorithm. FIG. 12A represents a generation in which objects have been allocated in nine car sections. The oldest train has four cars, numbered 1.1 through 1.4. Car 1.1 has two objects, A and B. There is a reference to object B in the root set (which, as was explained above, includes live objects in the other generations). Object A is referred to by object L, which is in the third train's sole car section. In the generation's remembered sets 170, a reference in object L has therefore been recorded against car 1.1.

Processing always starts with the oldest train's earliest-added car, so the garbage collector refers to car 1.1's remembered set and finds that there is a reference from object L into the car being processed. It accordingly evacuates object A to the train that object L occupies. The object being evacuated is often placed in one of the selected train's existing cars, but we will assume for present purposes that there is not enough room. So the garbage collector evacuates object A into a new car section and updates appropriate data structures to identify it as the next car in the third train. FIG. 12B depicts the result: a new car has been added to the third train, and object A is placed in it.

FIG. 12B also shows that object B has been evacuated to a new car outside the first train. This is because object B has an external reference, which, like the reference to object A, is a reference from outside the first train, and one goal of the processing is to form trains into which there are no further references. Note that, to maintain a reference to the same object, object L's reference to object A has had to be rewritten, and so have object B's reference to object A and the inter-generational pointer to object B. In the illustrated example, the garbage collector begins a new train for the car into which object B is evacuated, but this is not a necessary requirement of the train algorithm. That algorithm requires only that externally referenced objects be evacuated to a newer train.

Since car 1.1 no longer contains live objects, it can be reclaimed, as FIG. 12B also indicates. Also note that the remembered set for car 2.1 now includes the address of a reference in object A, whereas it did not before. As was stated before, remembered sets in the illustrated embodiment include only references from cars further back in the order than the one with which the remembered set is associated. The reason for this is that any other cars will already be reclaimed by the time the car associated with that remembered set is processed, so there is no reason to keep track of references from them.

The next step is to process the next car, the one whose index is 1.2. Conventionally, this would not occur until some collection cycle after the one during which car 1.1 is collected. For the sake of simplicity we will assume that the mutator has not changed any references into the generation in the interim.

FIG. 12B depicts car 1.2 as containing only a single object, object C, and that car's remembered set contains the address of an inter-car reference from object F. The garbage collector follows that reference to object C. Since this identifies object C as possibly reachable, the garbage collector evacuates it from car set 1.2, which is to be reclaimed. Specifically, the garbage collector removes object C to a new car section, section 1.5, which is linked to the train to which the referring object F's car belongs. Of course, object F's reference needs to be updated to object C's new location. FIG. 12C depicts the evacuation's result.

FIG. 12C also indicates that car set 1.2 has been reclaimed, and car 1.3 is next to be processed. The only address in car 1.3's remembered set is that of a reference in object G. Inspection of that reference reveals that it refers to object F. Object F may therefore be reachable, so it must be evacuated before car section 1.3 is reclaimed. On the other hand, there are no references to objects D and E, so they are clearly garbage. FIG. 12D depicts the result of reclaiming car 1.3's space after evacuating possibly reachable object F.

In the state that FIG. 12D depicts, car 1.4 is next to be processed, and its remembered set contains the addresses of references in objects K and C. Inspection of object K's reference reveals that it refers to object H, so object H must be evacuated. Inspection of the other remembered-set entry, the reference in object C, reveals that it refers to object G, so that object is evacuated, too. As FIG. 12E illustrates, object H must be added to the second train, to which its referring object K belongs. In this case there is room enough in car 2.2, which its referring object K occupies, so evacuation of object H does not require that object K's reference to object H be added to car 2.2's remembered set. Object G is evacuated to a new car in the same train, since that train is where referring object C resides. And the address of the reference in object G to object C is added to car 1.5's remembered set.

FIG. 12E shows that this processing has eliminated all references into the first train, and it is an important part of the train algorithm to test for this condition. That is, even though there are references into both of the train's cars, those cars' contents can be recognized as all garbage because there are no references into the train from outside of it. So all of the first train's cars are reclaimed.

The collector accordingly processes car 2.1 during the next collection cycle, and that car's remembered set indicates that there are two references outside the car that refer to objects within it. Those references are in object K, which is in the same train, and object A, which is not. Inspection of those references reveals that they refer to objects I and J, which are evacuated.

The result, depicted in FIG. 12F, is that the remembered sets for the cars in the second train reveal no inter-car references, and there are no inter-generational references into it, either. That train's car sections therefore contain only garbage, and their memory space can be reclaimed.

So car 3.1 is processed next. Its sole object, object L, is referred to inter-generationally as well as by a reference in the fourth train's object M. As FIG. 12G shows, object L is therefore evacuated to the fourth train. And the address of the reference in object L to object A is placed in the remembered set associated with car 3.2, in which object A resides.

The next car to be processed is car 3.2, whose remembered set includes the addresses of references into it from objects B and L. Inspection of the reference from object B reveals that it refers to object A, which must therefore be evacuated to the fifth train before car 3.2 can be reclaimed. Also, we assume that object A cannot fit in car section 5.1, so a new car 5.2 is added to that train, as FIG. 12H shows, and object A is placed in its car section. All referred-to objects in the third train having been evacuated, that (single-car) train can be reclaimed in its entirety.

A further observation needs to be made before we leave FIG. 12G. Car 3.2's remembered set additionally lists a reference in object L, so the garbage collector inspects that reference and finds that it points to the location previously occupied by object A. This brings up a feature of copying-collection techniques such as the typical train-algorithm implementation. When the garbage collector evacuates an object from a car section, it marks the location as having been evacuated and leaves the address of the object's new location. So, when the garbage collector traces the reference from object L, it finds that object A has been removed, and it accordingly copies the new location into object L as the new value of its reference to object A.

In the state that FIG. 12H illustrates, car 4.1 is the next to be processed. Inspection of the fourth train's remembered sets reveals no inter-train references into it, but the inter-generational scan (possibly performed with the aid of FIG. 6's card tables) reveals inter-generational references into car 4.2. So the fourth train cannot be reclaimed yet. The garbage collector accordingly evacuates car 4.1's referred-to objects in the normal manner, with the result that FIG. 12I depicts.

In that state, the next car to be processed has only inter-generational references into it. So, although its referred-to objects must therefore be evacuated from the train, they cannot be placed into trains that contain references to them. Conventionally, such objects are evacuated to a train at the end of the train sequence. In the illustrated implementation, a new train is formed for this purpose, so the result of car 4.2's processing is the state that FIG. 12J depicts.

Processing continues in this same fashion. Of course, subsequent collection cycles will not in general proceed, as in the illustrated cycles, without any reference changes by the mutator and without any addition of further objects. But reflection reveals that the general approach just described still applies when such mutations occur.

From the foregoing description, it can be appreciated that maintaining remembered sets for respective cars greatly expedites incremental collection. Since the remembered sets keep track of which locations have been found during previous increments to contain references to a car's objects, the collector needs to scan only those regions that the mutator has reported to have been modified since the preceding increment. Collectors that employ the train algorithm are not the only ones that employ remembered sets for this purpose. Other incremental collectors, too, divide the heap or portions of it into heap sections with which they associate respective remembered sets. And they use them similarly in successive increments to remember the references into those heap sections that the collector discovered during previous increments. But train-algorithm collectors give a good example of how remembered sets are employed and the operational problems that they present.

One of those problems is the time required to maintain them. For one thing, it is important to avoid duplicate entries in the remembered set. So the operation of adding an entry is actually relatively time-consuming, since it involves searching the remembered set to determine whether an entry already exists for the location of the reference that the collector has found. Usually the remembered-set data structure is implemented as a hash table in order to expedite the search operation, but the search operation is still time-consuming. Of course, it is less time-consuming than scanning the entire heap during each collection increment would be. But it still exacts a cost, one that workers in this field have worked diligently to minimize.

In systems that are multi-threaded, for example, they have taken advantage of the fact that remembered-set maintenance lends itself fairly well to parallel operations. Unfortunately, most parallelized approaches require some degree of synchronization among the concurrently operating threads. For example, suppose that the data structure employed for recording a remembered set is maintained as an open-addressed hash table. In this kind of hash table, indexes are associated with respective slots in an array, and the address of the reference location to be recorded in the table is subjected to a hash function whose range is the sequence of slot indexes. A thread attempting to make a remembered-set entry first reads the slot contents of the array to which the address of the reference to be recorded hashes. If the contents of that slot indicate that it is empty, the thread can place an identifier of that reference's location in that slot.

If the slot's contents instead indicate that it already contains a reference-location identifier, the thread determines whether that identifier identifies the reference location that it is attempting to record. If so, the thread does not need to make an entry. Indeed, the primary reason for employing a hash table is thus to avoid duplication. If the slot's contents identify some other location, though, the thread will probe some sequence of alternative slots, one at a time, until it (1) finds one that is empty, (2) finds one that already contains the desired entry, or (3) finds that all slots are otherwise occupied.

If the table is not currently being replaced, all of the operations of searching through the hash table can be performed concurrently by multiple threads in the same table without synchronization. But the actual writing operation does require synchronization. That is, a given thread that reads a slot and finds it empty must ensure that some other thread does not write into that slot before the given thread does; otherwise, the given thread will write over the other thread's entry. This synchronization can be accomplished conveniently by taking advantage of the atomic operations that most modem processor architectures provide. Whereas reading and writing operations are ordinarily separate, a processor can be called upon to perform atomically a combination of reading and writing operations that in other contexts are performed separately.

An example of a type of atomic operation provided by some processor architectures is the compare-and-swap operation. That operation's arguments are a target address, an expected value, and a replacement value. The compare-and-swap operation reads the contents of the target location, compares the contents with the expected value, is and—only if the reading portion of the operation revealed that the target location's contents were the expected value—writes the replacement value into that location. Since this operation is performed atomically—i.e., without the possibility of another thread's writing into the same location between the reading and the writing—a thread can observe an empty slot and then fill it without the danger of overwriting another thread's entry.

Unfortunately, although such approaches do permit a relatively high degree of parallelism, atomic-operation and similar synchronization mechanisms tend to be expensive. A compare-and-swap operation, for instance, may take forty to fifty machine cycles or more, roughly doubling the cost of the average insertion operation. Furthermore, threads performing insertions must coordinate whenever a remembered set needs expansion.

SUMMARY OF THE INVENTION

I have found a way of minimizing the cost of synchronization in parallel remembered-set maintenance. In accordance with this approach, each remembered set is stored in a plurality of structures, e.g., in a plurality of hash tables. Each of a given remembered set's structures is associated with a different one of a plurality of "stripes" into which the memory space potentially containing references to be recorded is divided. The various remembered-set data structures are then grouped, and different groups are assigned to different threads. Each thread writes entries only in structures belonging to the group currently assigned to it. So more than one thread can concurrently write to the same remembered set without the need for atomic operations or other synchronization operations.

BRIEF DESCRIPTION OF THE DRAWINGS

The invention description below refers to the accompanying drawings, of which:

FIGS. 12A–12J, discussed above, are diagrams that illustrate a collection scenario that can result from using the train algorithm;

FIG. 13 is a data-structure diagram used to illustrate one embodiment of the invention;

DETAILED DESCRIPTION OF AN ILLUSTRATIVE EMBODIMENT

Figure 1:
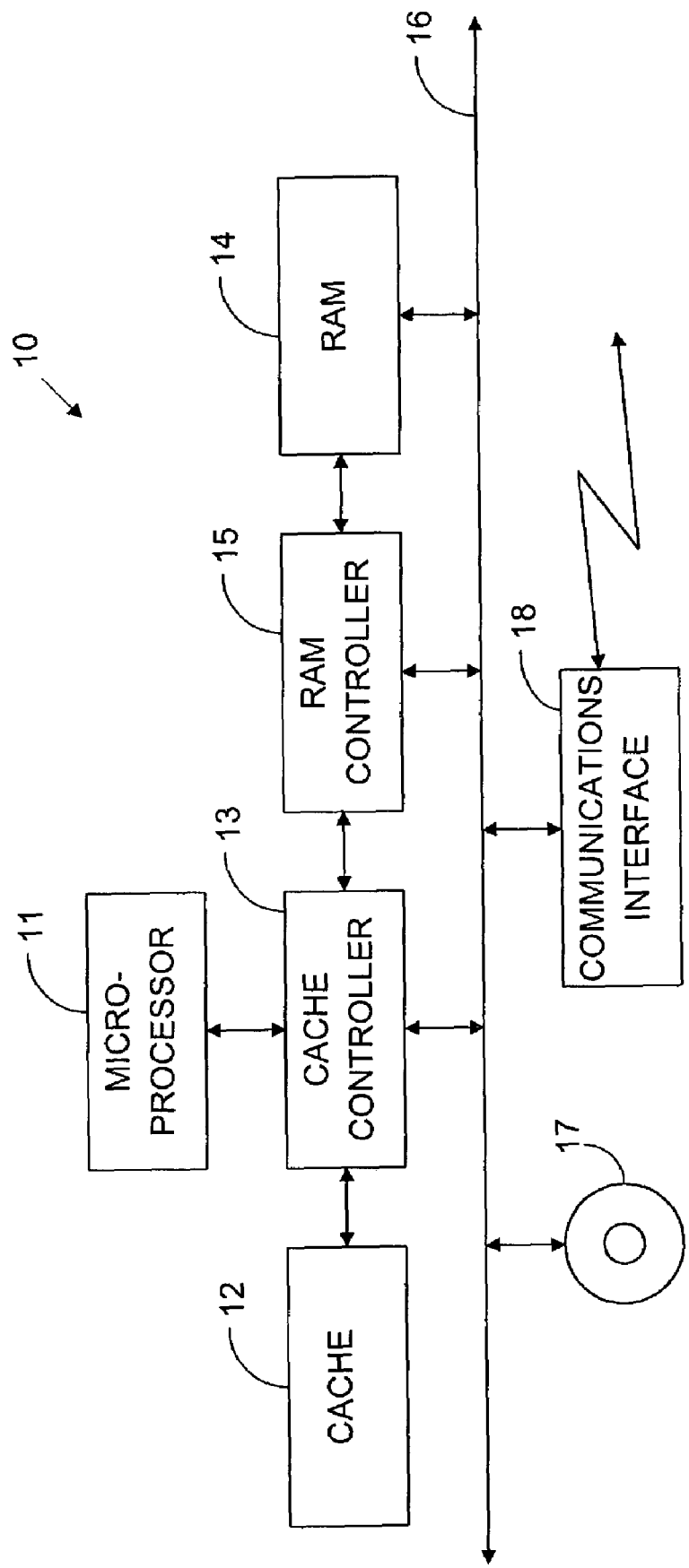
FIG. 1, discussed above, is a block diagram of a computer system in which the present invention's teachings can be practiced.
Figure 2:
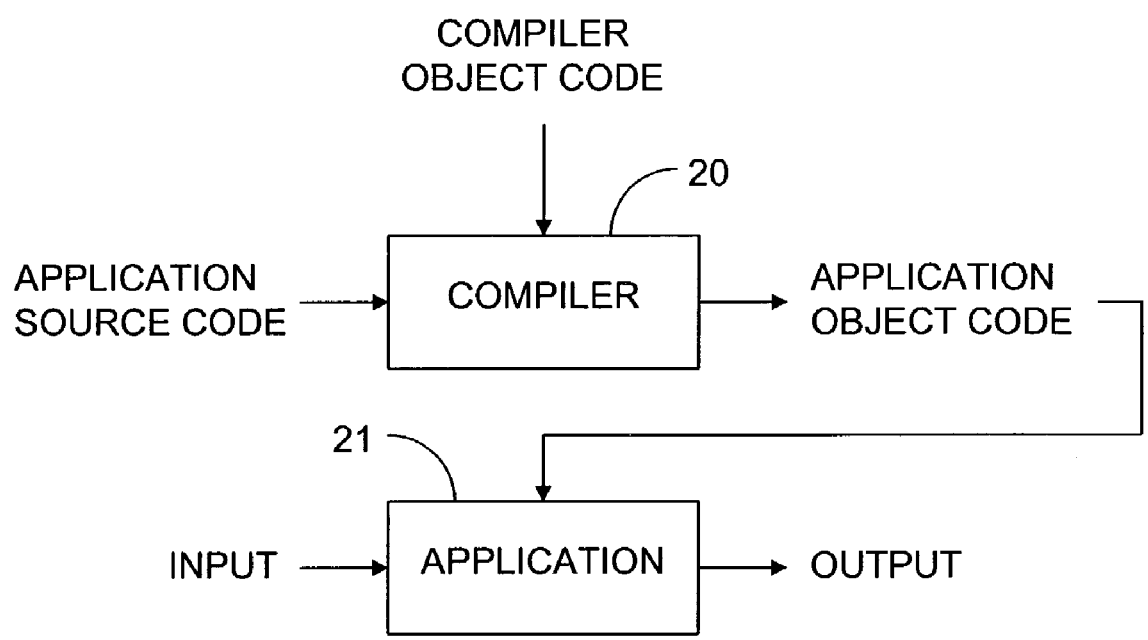
FIG. 2 is, discussed above, is a block diagram that illustrates a compiler's basic functions.
Figure 3:
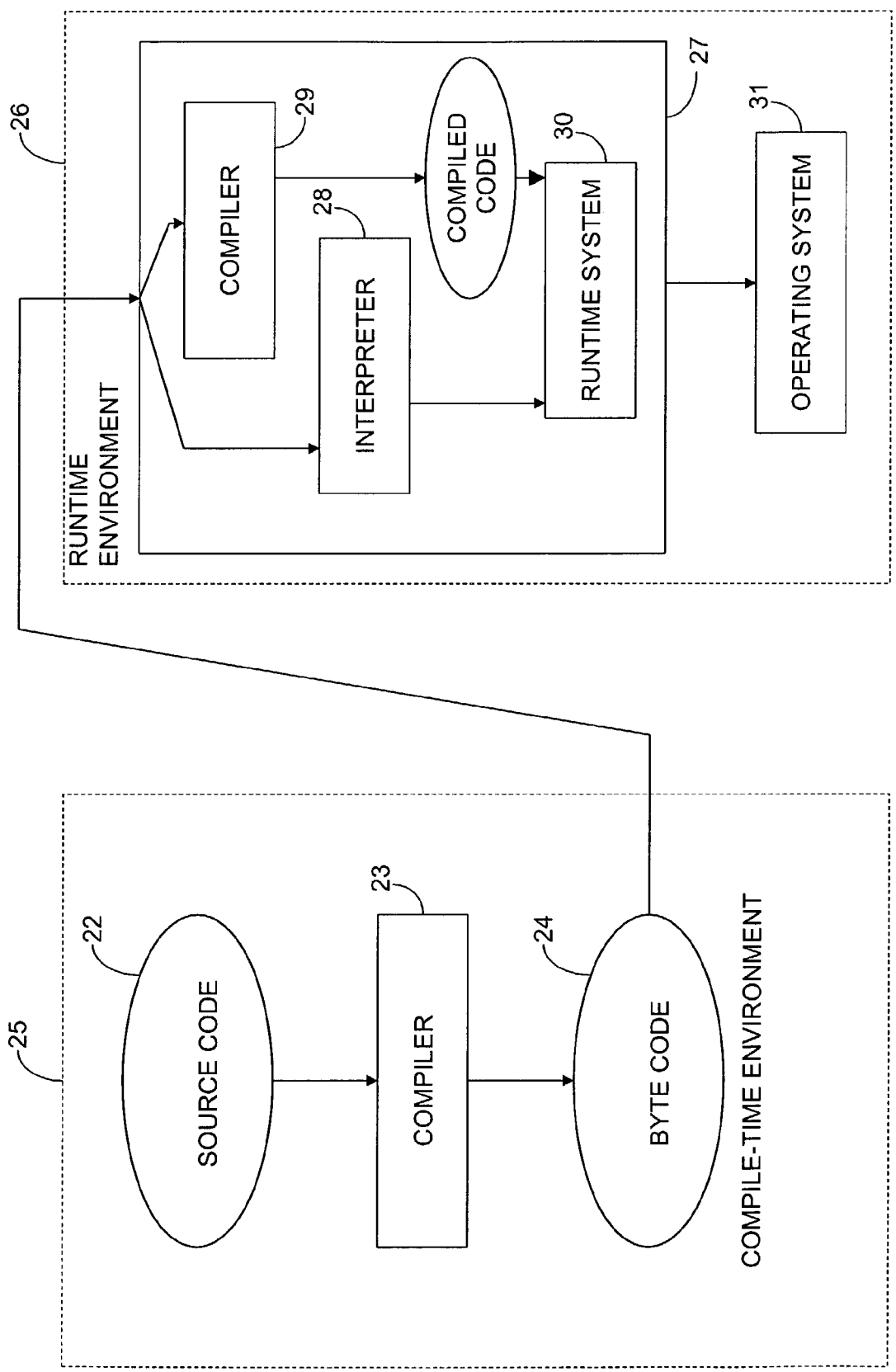
FIG. 3, discussed above, is a block diagram that illustrates a more-complicated compiler/interpreter organization.
Figure 4:
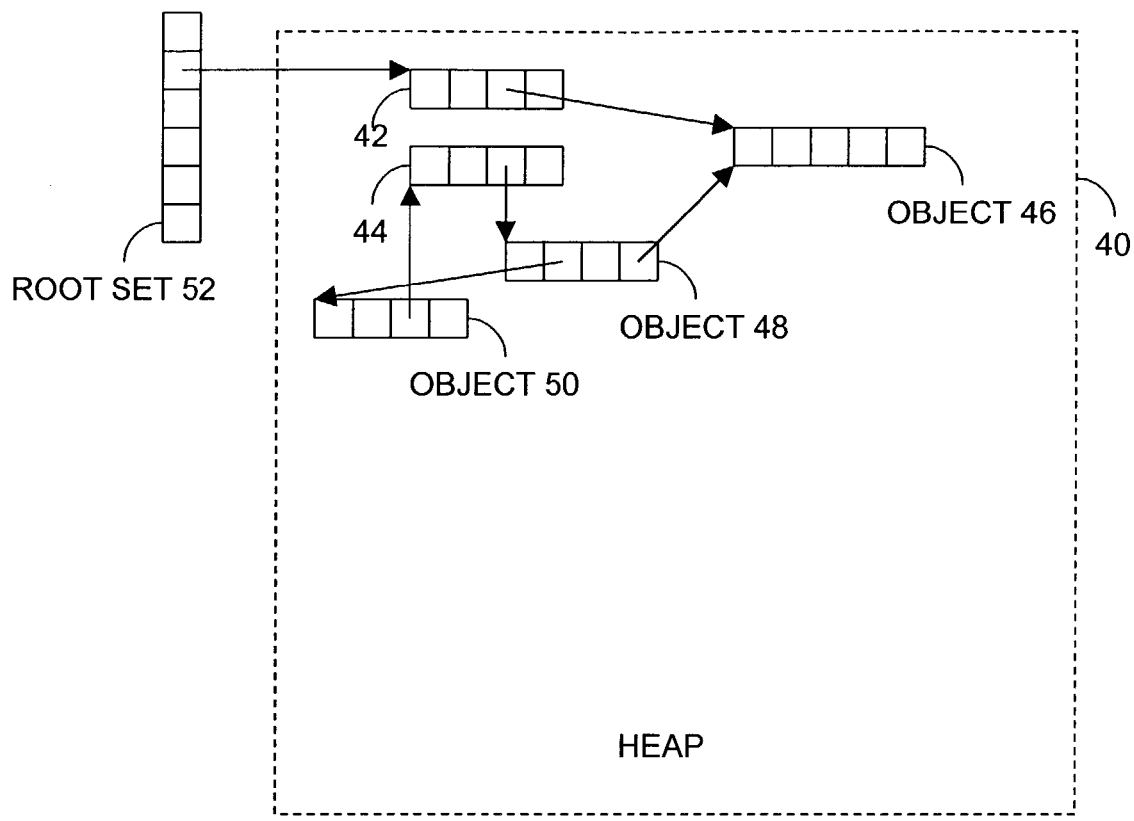
FIG. 4, discussed above, is a diagram that illustrates a basic garbage-collection mechanism.
Figure 5:
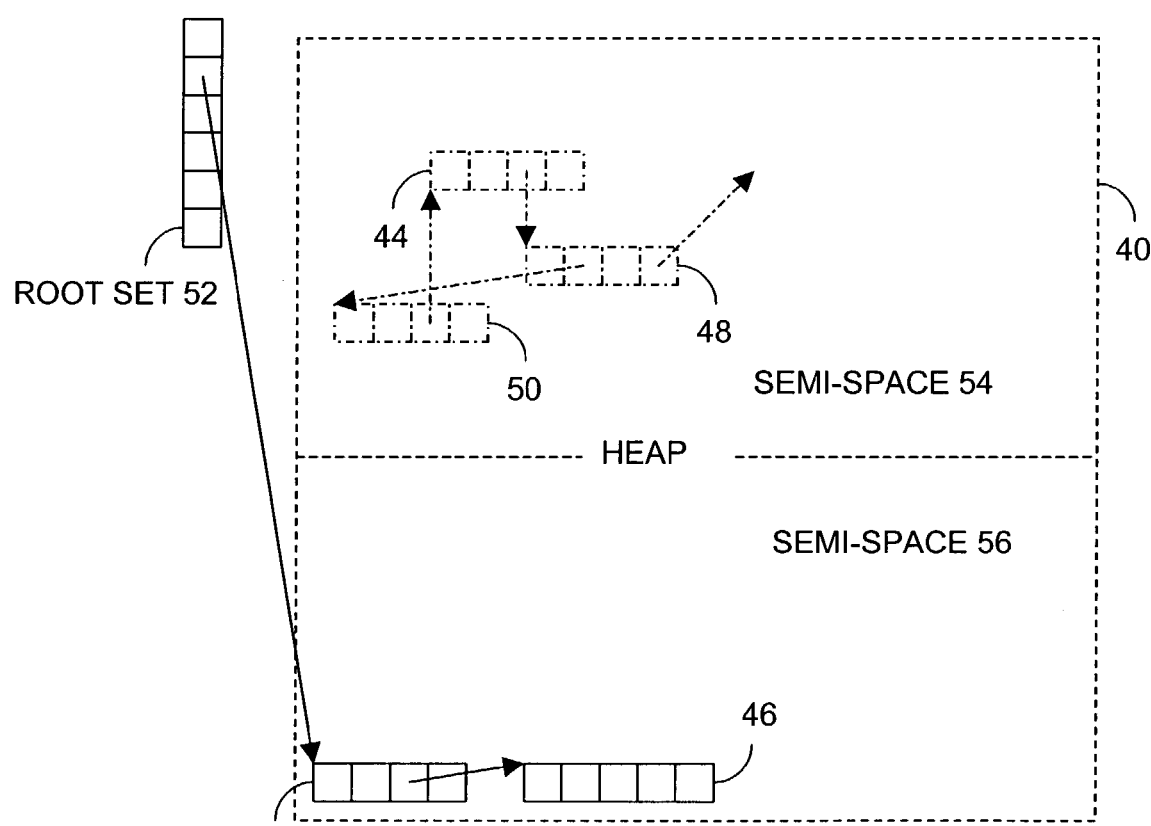
FIG. 5, discussed above, is a similar diagram illustrating that garbage-collection approach's relocation operation.
Figure 6:
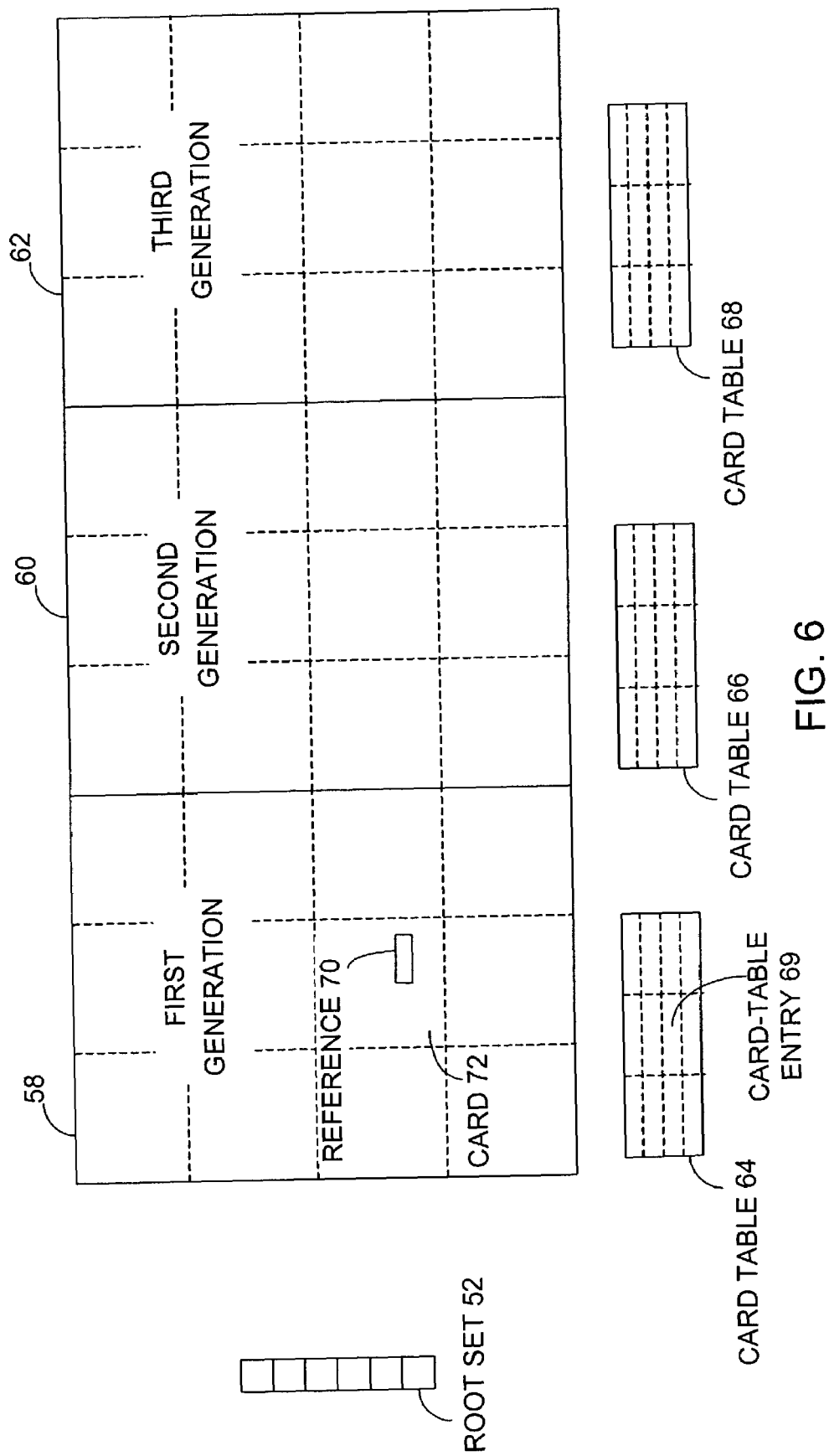
FIG. 6, discussed above, is a diagram that illustrates a garbage-collected heap's organization into generations.
Figure 7:
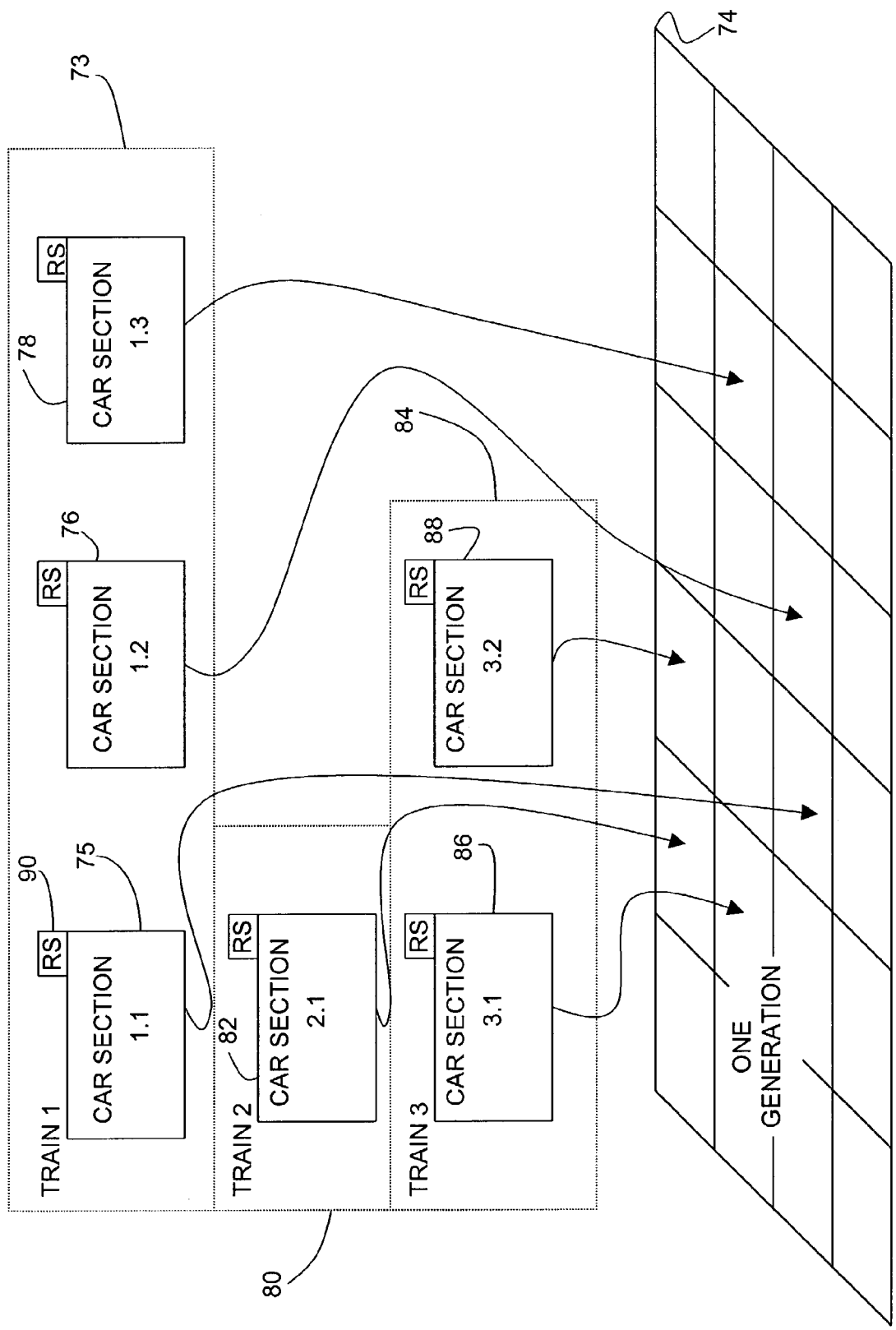
FIG. 7, discussed above, is a diagram that illustrates a generation organization employed for the train algorithm.
Figure 8A:
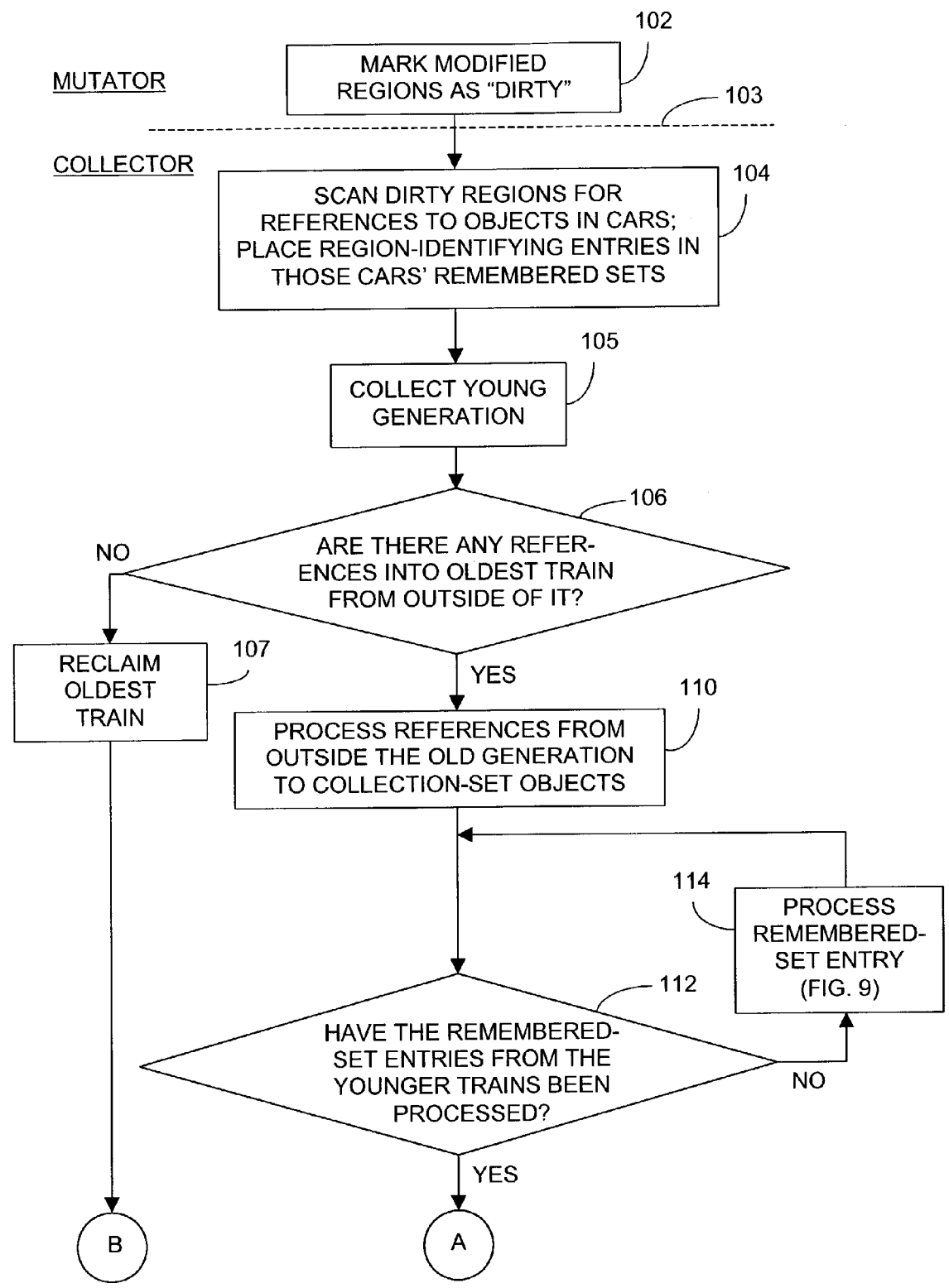
FIGS. 8A and 8B, discussed above, together constitute a flow chart that illustrates a garbage-collection interval that includes old-generation collection.
Figure 8B:
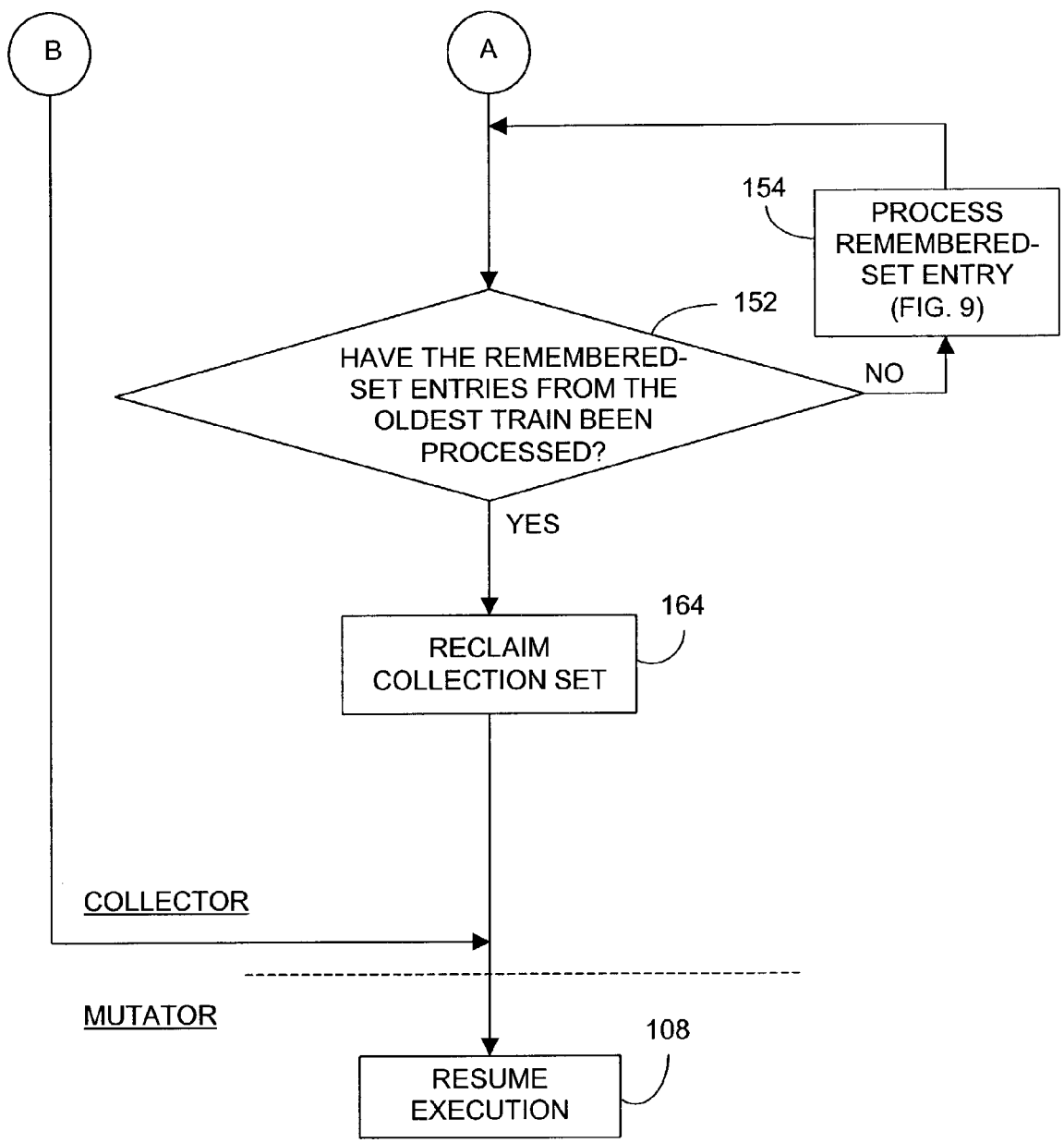
Figure 9:
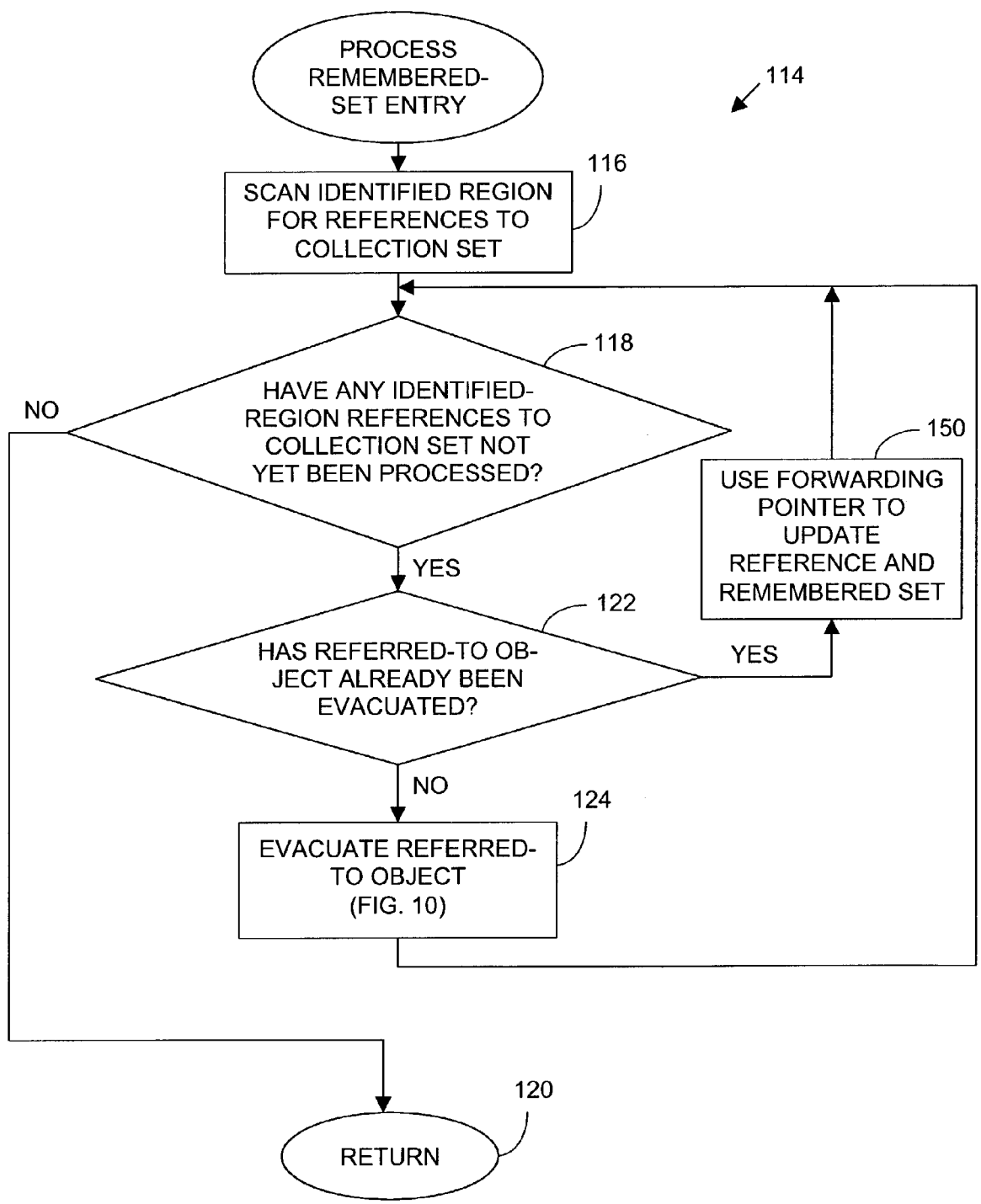
FIG. 9, discussed above, is a flow chart that illustrates in more detail the remembered-set processing included in FIG. 8A.
Figure 10:
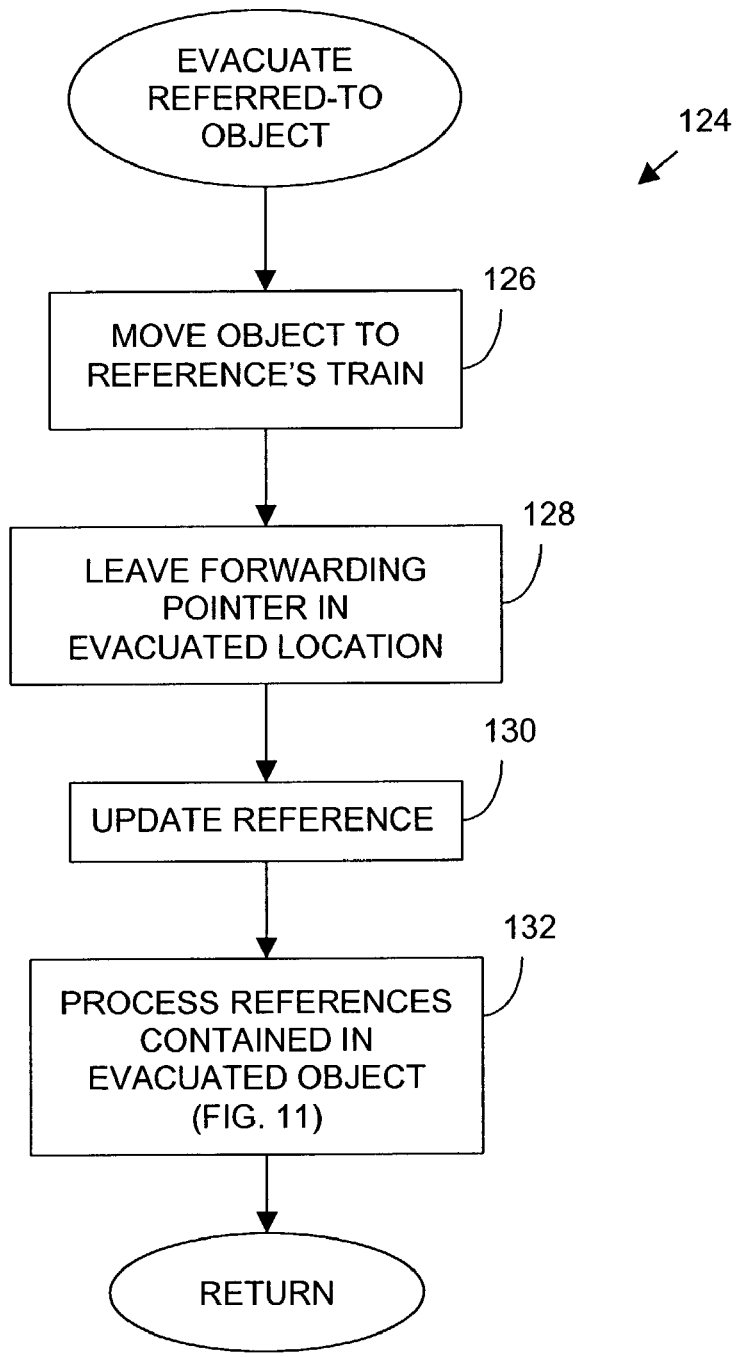
FIG. 10, discussed above, is a block diagram that illustrates in more detail the referred-to-object evacuation that FIG. 9 includes.
Figure 11A:
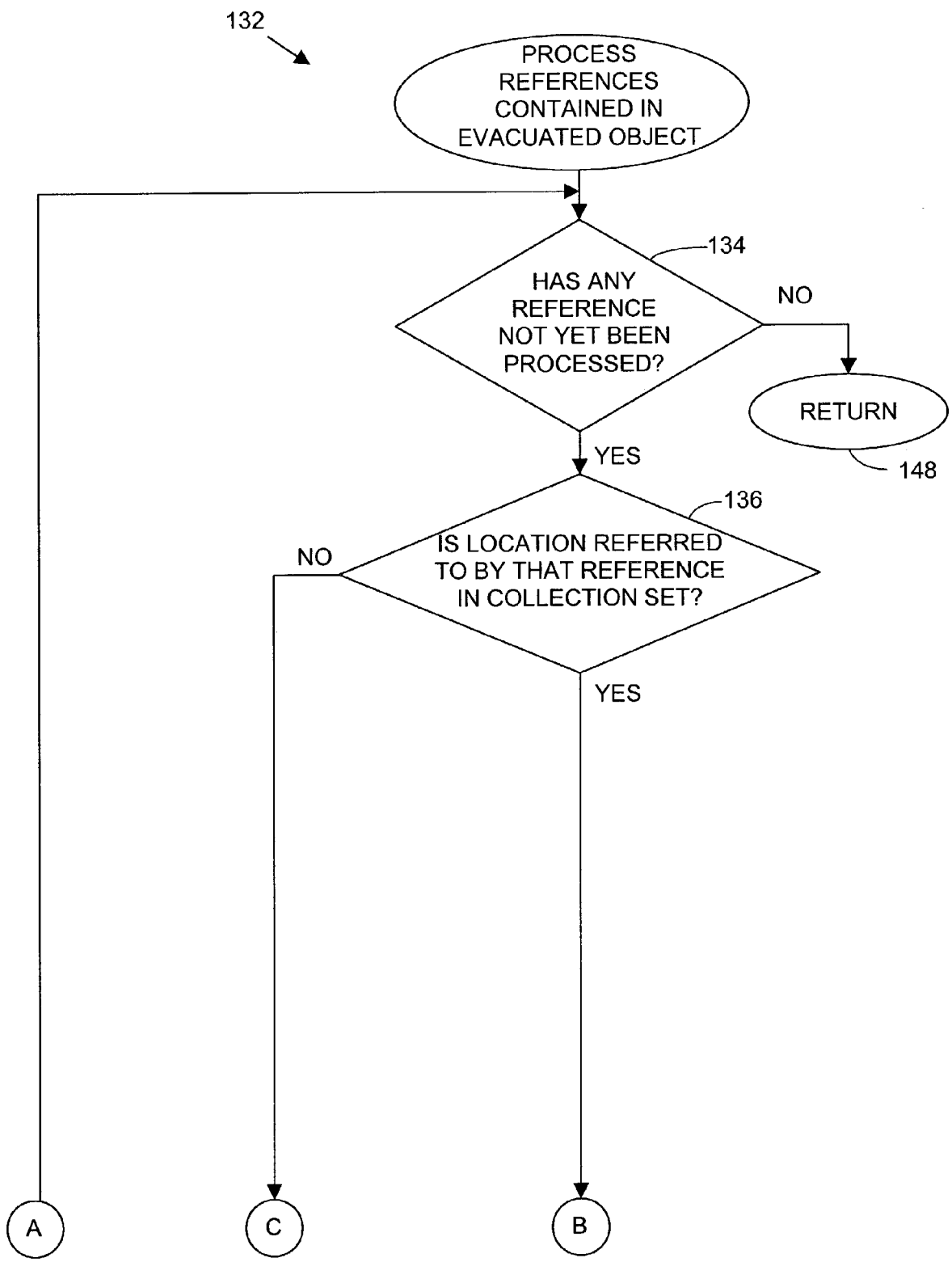
FIGS. 11A and 11B, discussed above, together form a flow chart that illustrates in more detail the FIG. 10 flow chart's step of processing evacuated objects' references.
Figure 11B:
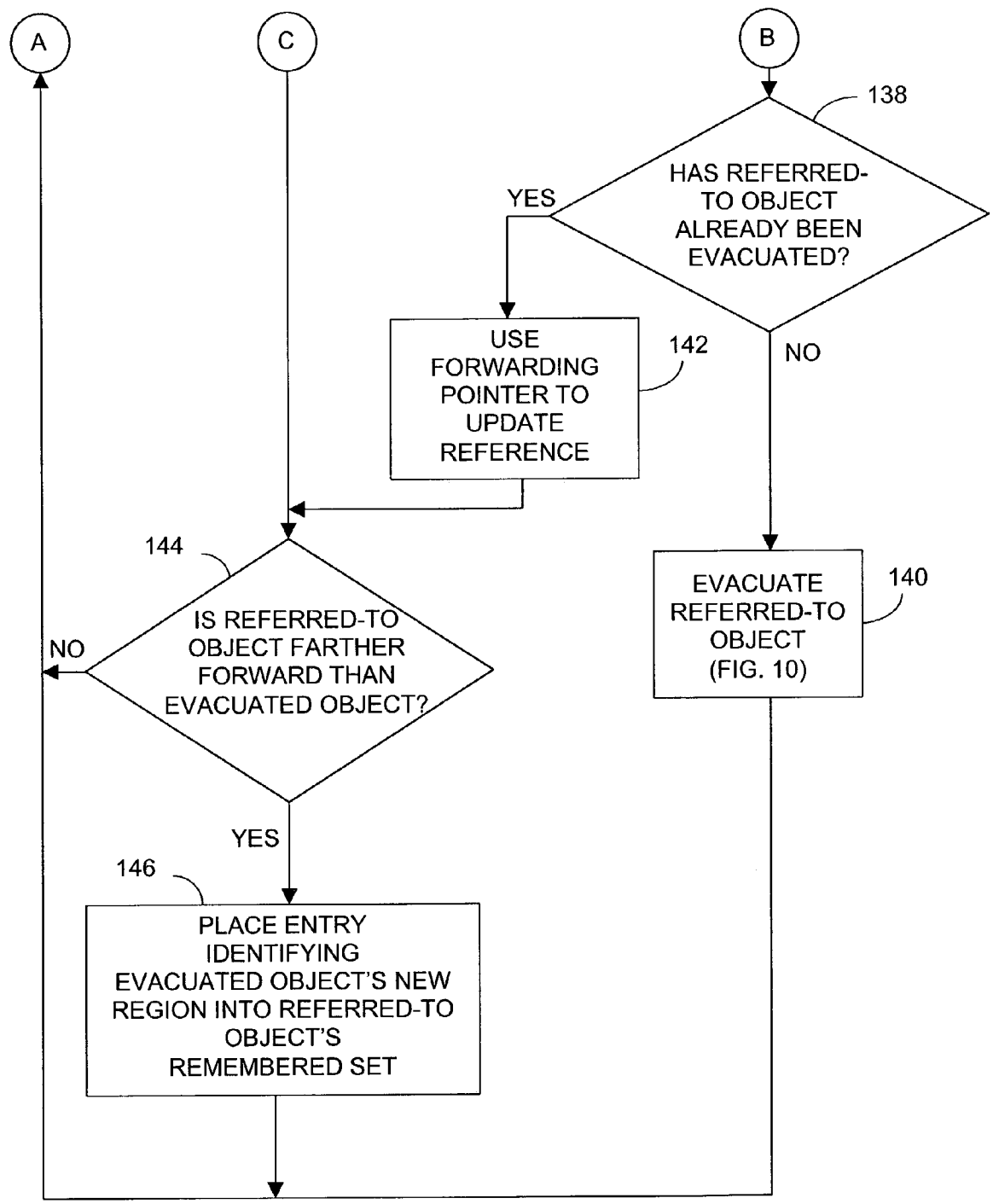
Figure 12A:
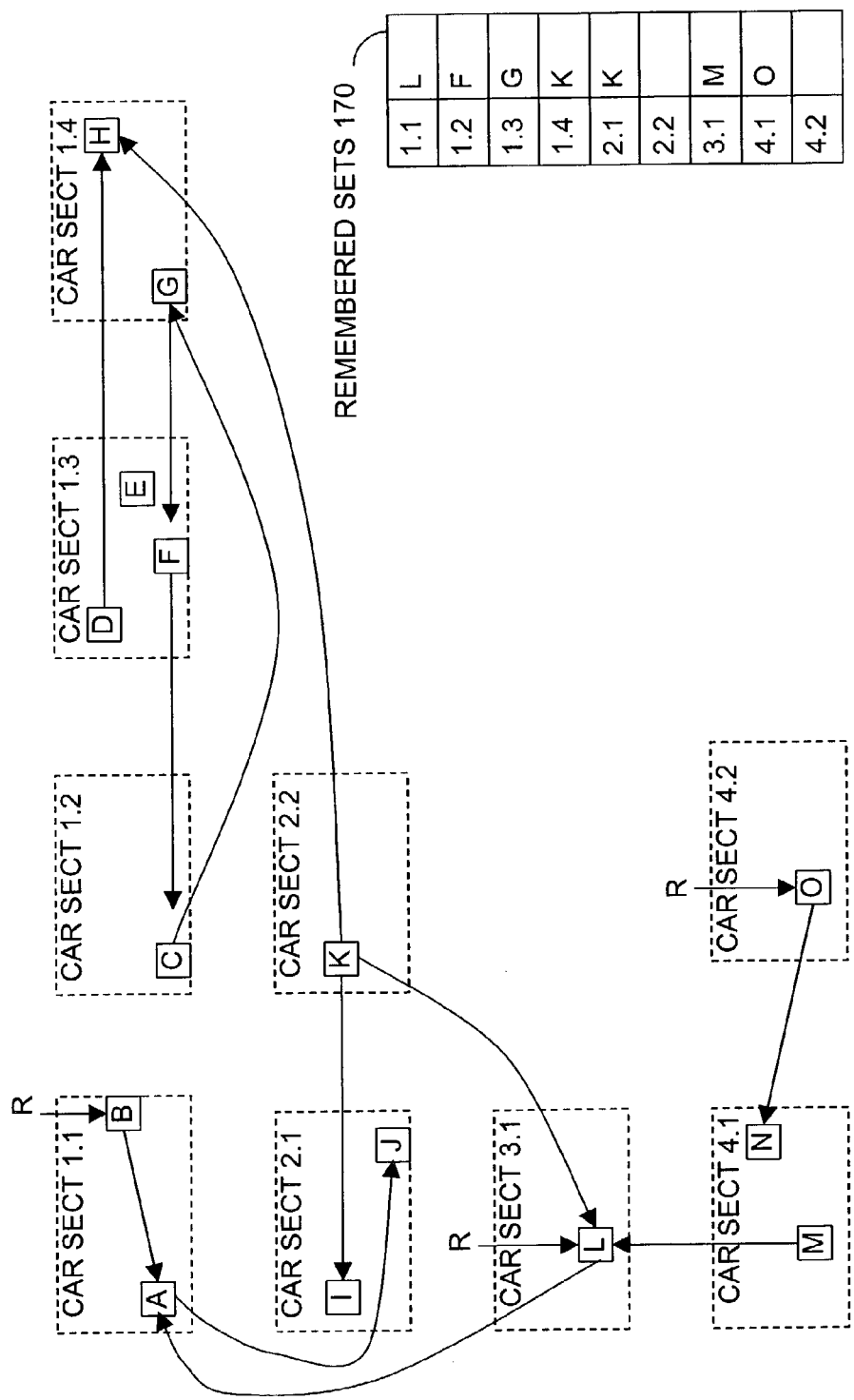
Figure 12B:
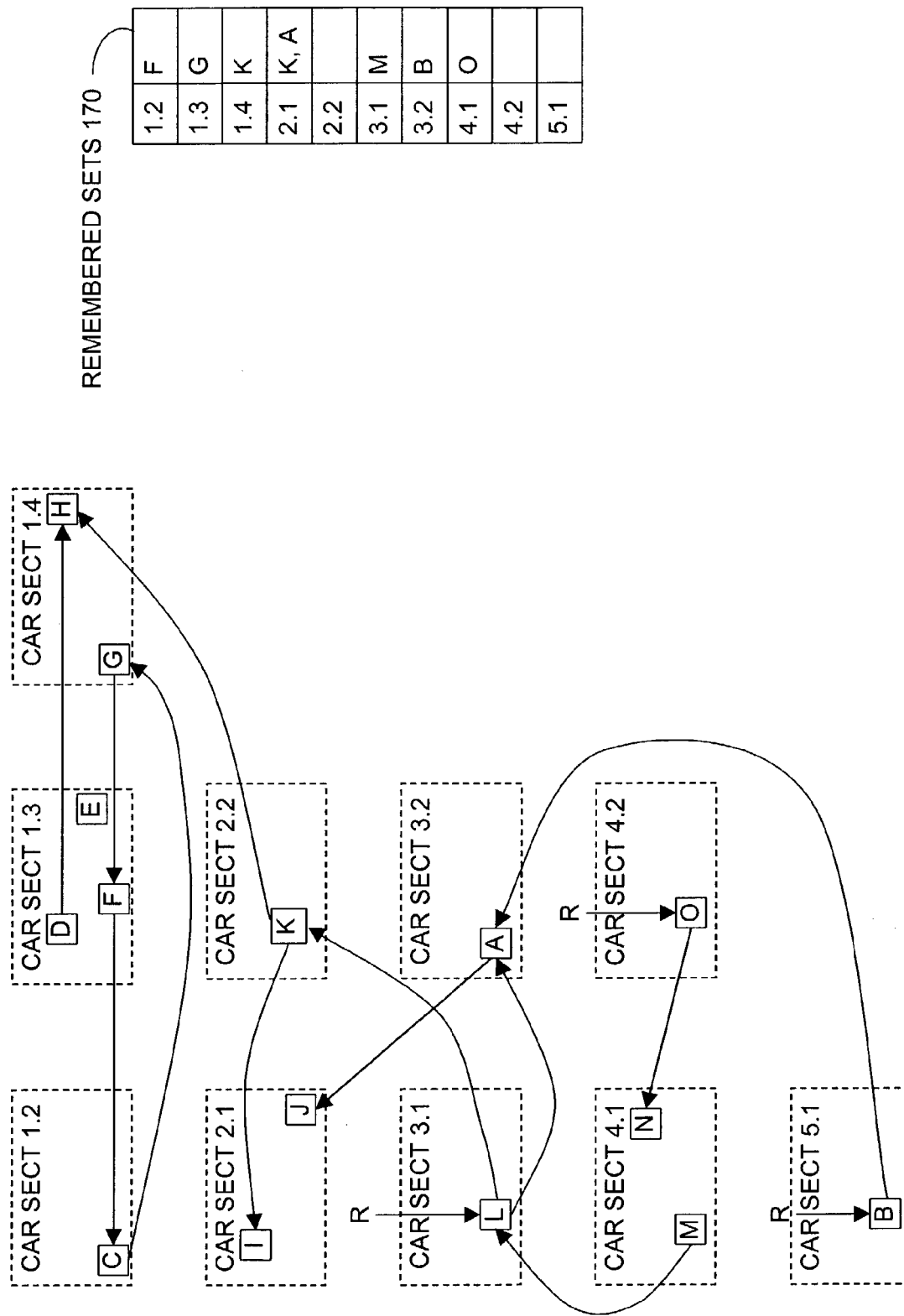
Figure 12C:
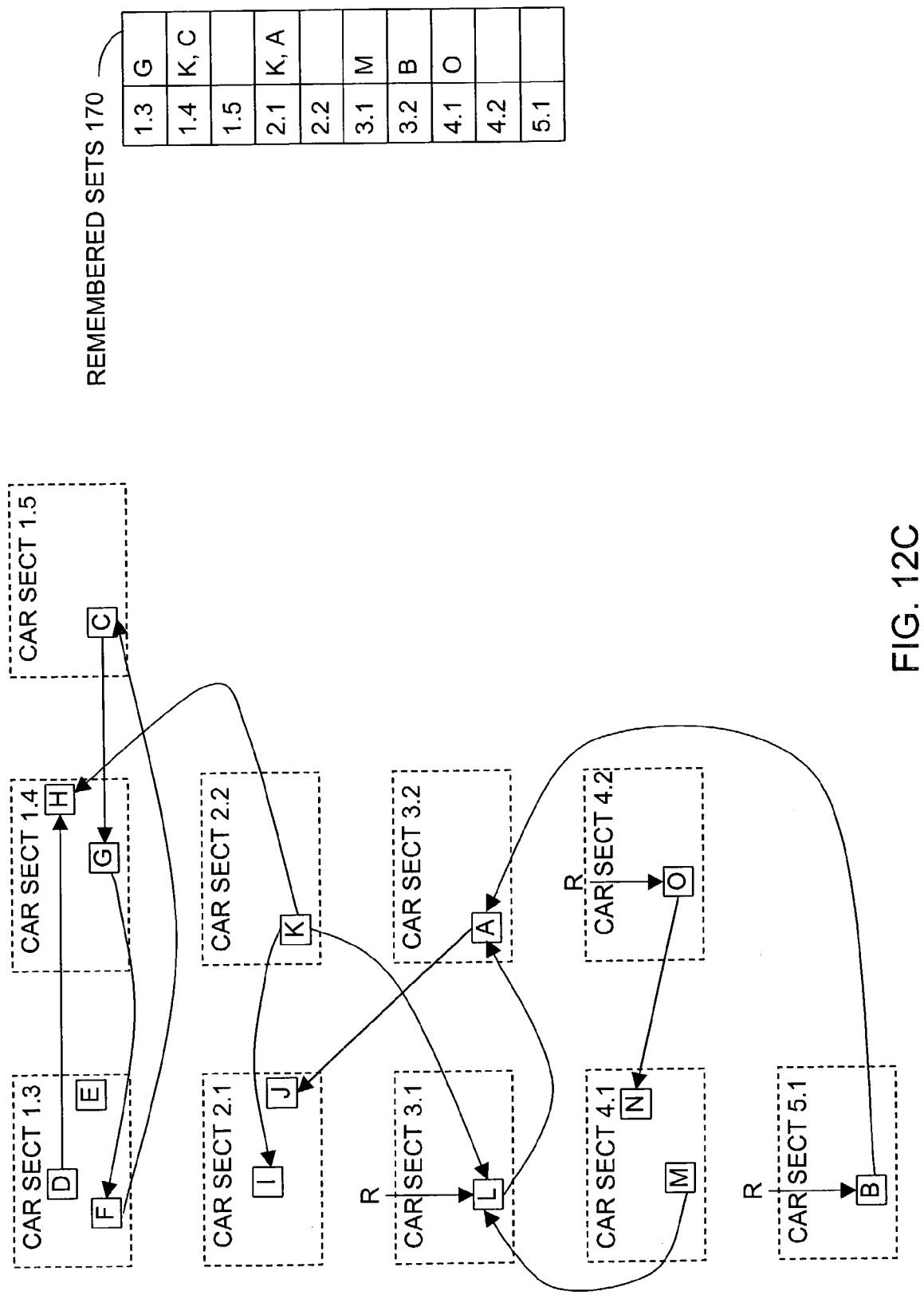
Figure 12D:
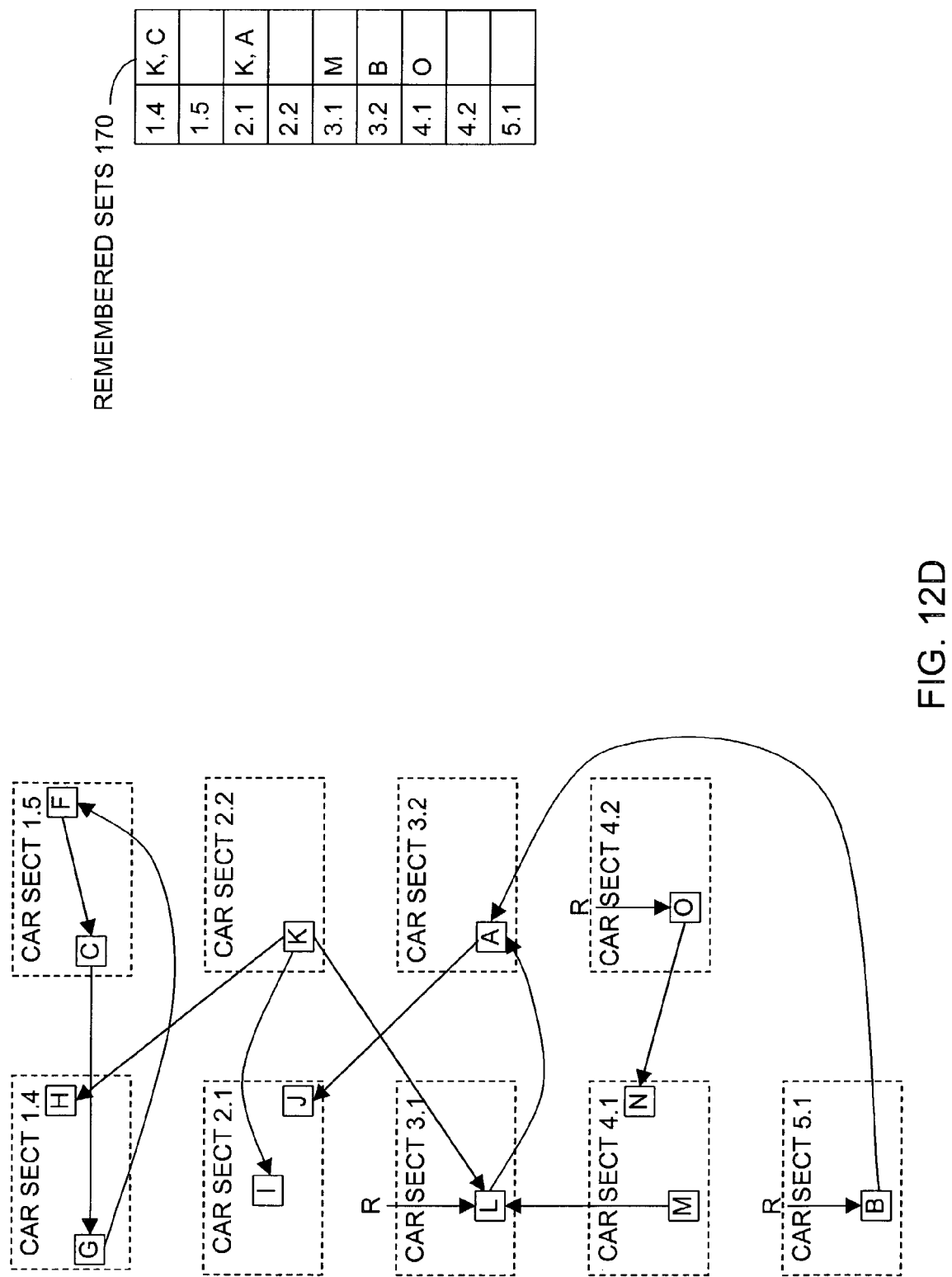
Figure 12E:
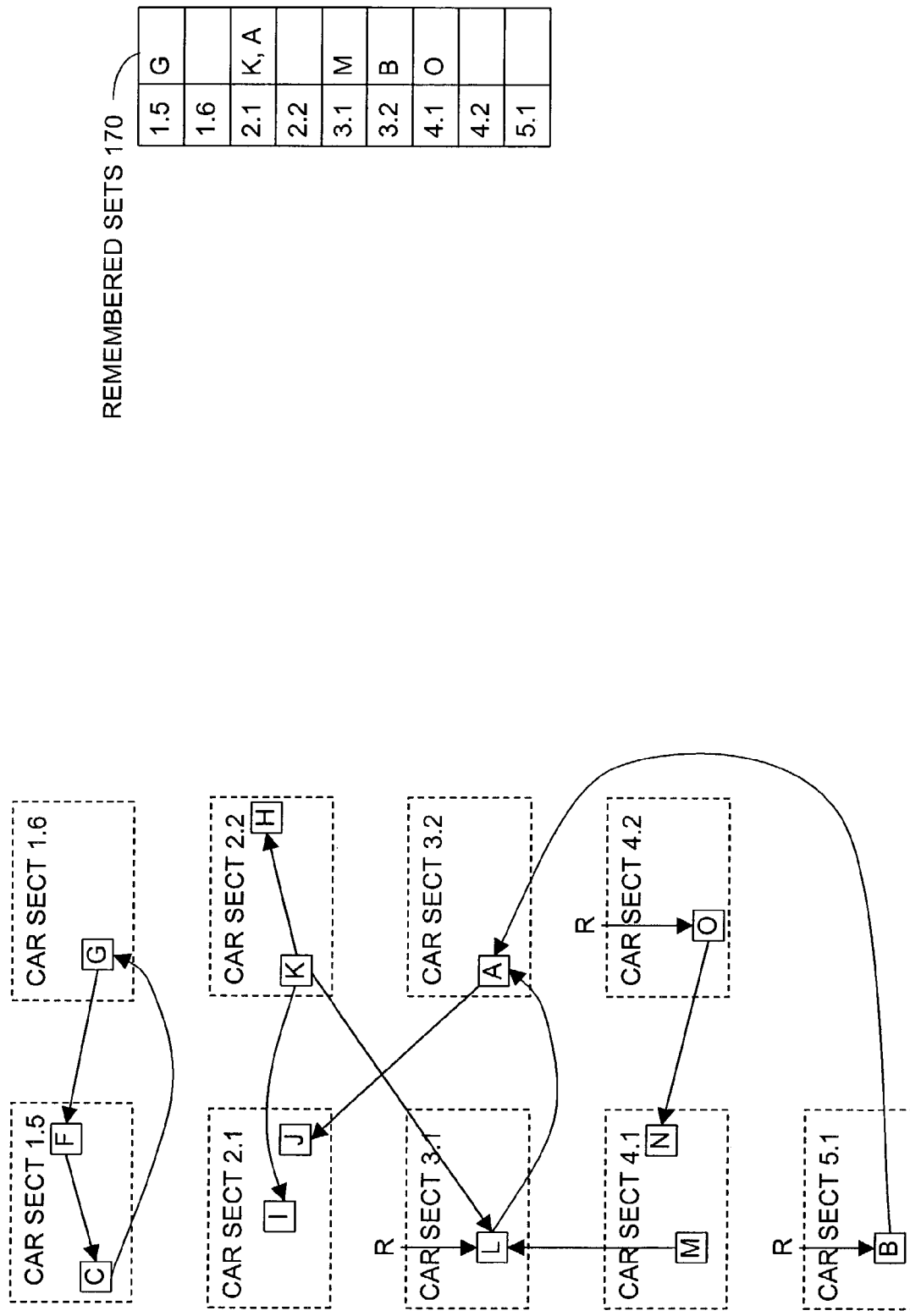

Although the present invention's applicability is not limited to collectors that employ the train algorithm, we will assume in the discussion that follows that the illustrated embodiment employs that algorithm, and we will therefore refer to the heap segments with which remembered sets are associated as car sections.

We will also assume that the collector maintains metadata for each car section in a respective data structure of which FIG. 13 provides a representation 200. The only fields of that structure that are of interest in the present discussion are those in a pointer array 202. The array's pointers point to respective data structures 204, 206, 208, and 210, in which the collector stores remembered-set entries for the associated car. That is, it stores identifiers of the locations where it has found references to objects located in the car section with which the metadata structure 200 is associated.

As was mentioned above, a collector typically begins a collection increment by performing a remembered-set-updating operation. To update the remembered sets, it scans heap regions that the mutator has identified as containing references modified since the last interval. By reading each reference in each region thus identified as being "dirty," the collector determines the location of the object to which the reference refers. As those skilled in the art will recognize, the location of the metadata structure associated with the car section containing the referred-to object can usually be inferred readily from the object's address. The collector can therefore read a remembered-set pointer and thereby locate the remembered-set data structure. It then makes an entry in that structure if doing so does not result in duplication.

According to the invention, this updating operation is performed in a plurality of concurrently executing garbage-collector threads. And different concurrently executing threads operate in such a manner that they are guaranteed not to write into the same constituent remembered-set structure concurrently.

The way in which the embodiment of FIG. 13 implements this concept is to divide into "stripes" the heap or portion thereof whose reference locations the remembered sets record. Reference numeral 212 refers to that portion of the heap, which the drawing depicts as divided into four stripes. Stripe as used here merely means any one of a plurality of groups of locations into which the heap or a heap portion of interest is divided. The term stripe is used because most embodiments' groupings will lend themselves to illustration in such a way as to suggest that term.

To understand the particular striping employed by the illustrated embodiment, consider heap portion 212 as being divided into what FIG. 13 depicts as rectangles. Each rectangle here represents a group of locations having contiguous addresses, and rectangles adjacent in the same row form a continuous sequence of address locations.

For the sake of concreteness, let us assume that each rectangle represents say, 2 K bytes of memory. That is, the first row of rectangles in heap portion 212 represents locations whose addresses form a continuous 8K sequence. The next row represents the locations having the next 8 K addresses, the third row represents the locations having the 8K addresses after that, etc. Given this organization, the first stripe 214 consists of the memory locations that the first column of rectangles represents, while the second, third, and fourth stripes 216, 218, and 220 respectively consist of the locations represented by the second, third, and fourth columns of rectangles.

To identify the stripe associated with a given address, therefore, one in principle begins by dividing the rectangle size, say 2K, into the address. The quotient's integer part, which identifies the rectangle in which the address is located, is then divided by the number of stripes. The remainder identifies the stripe. If the rectangles are suitably aligned, and if the rectangle size and number of stripes are chosen to be powers of two, those computations can be performed in practice through simple shift and mask operations. And the address of the next rectangle in the same stripe can be obtained from the current rectangle's address by a simple addition.

While the scheme used by the illustrated embodiment for mapping rectangles to stripes is simple, any permutation or assignment of rectangles to stripes can be used. If there are N stripes, for example, the rectangles can be divided into groups of N consecutive rectangles, and the order in which rectangles are assigned to stripes within successive groups can be permuted. In the case in which the permutation is a simple rotation left, a stripe that is assigned the first rectangle in one rectangle group will be assigned the second rectangle in the next rectangle group, and so on.

The way in which the illustrated embodiment minimizes the need for synchronization is to associate the different stripes with the different remembered-set structures in the different cars. That is, the first stripe may be associated with the each car's first remembered-set structure, the second stripe with each car's second remembered-set structure, etc.

Now assume that, at some point in the reference-recording operation, the collector is performing that operation in four concurrently executing threads. When the collector enters this phase of its operation, it can assign each thread to a different stripe, and that stripe will scan only the dirty cards in that stripe. Each remembered-set structure is intended to receive only entries representing locations in its associated stripe, so a plurality of threads concurrently making entries into the same remembered set are guaranteed not to overwrite each other's entries or to interfere with each other should when some remembered-set structure is being expanded.

Although stripes can thus be assigned to threads statically, improved load balancing may result if, for instance, there are more stripes than threads. For example, suppose that there are only two threads but four stripes. The first two stripes could be assigned initially to the two threads, and then a thread that has finished scanning its stripe could claim a stripe that had previously been unclaimed.

Although the way in which the claiming operation is performed is not critical, the illustrated embodiment uses a simple counter 222 for this purpose. The counter begins with a count of zero, meaning that the next stripe to be claimed is the first one. The collector increments that counter twice when it assigns the first two strips. This results in the indicated value of 102, indicating that the third stripe is to be claimed next. So, when one of the threads completes scanning its stripe, it claims the next stripe by using, say, an atomic compare-and-swap operation to increment the counter. Thus assigning stripes dynamically does require synchronization, but only for the stripe claiming itself; the updating operation requires no other synchronization.

Some of the more-advanced machines support hundreds or even thousands of highly parallel threads. In some such systems, providing more data structures than threads may not be practical. For a given total amount of memory allocated to remembered-set structures, a higher number of stripes means that the sizes of the individual structures need to be smaller on average. Beyond some point, thus making hash tables smaller becomes undesirable because the fraction of hash-table memory used for over-head becomes too great. Not only does this make memory use less efficient but it also necessitates more table-replacement operations, which have to be performed when tables become full. To take full advantage of the threads' load-balancing potential without making the remembered-set structures too small, the groups of structures can be subdivided further, i.e., not just in accordance with the heap striping.

One way of doing so is additionally to divide them in accordance with groups of the car sections to which they belong. That is, each thread claims a combination of stripe and car-section (and thus remembered-set) group. It scans only dirty cards located in the stripe thus claimed, and, when it thereby finds a reference, it records that reference's location in a remembered set only if that remembered set belongs to the group it has claimed.

Figure 14:
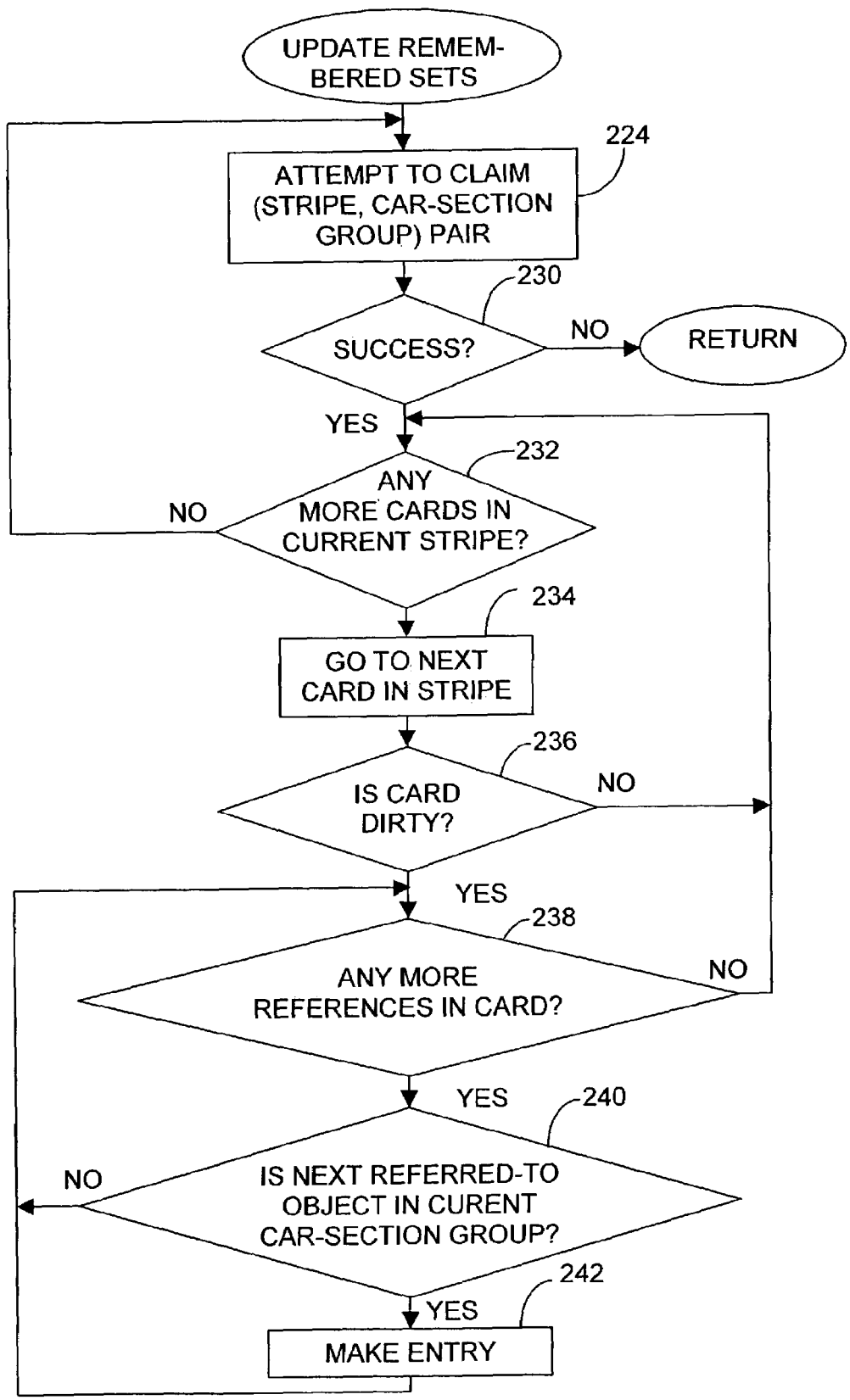
FIG. 14 is flow chart used to illustrate another embodiment of the invention.

FIG. 14 depicts a routine that a thread may use for remembered-set updating in accordance with this scheme. Block 224 represents claiming a combination of stripe and remembered-set group. As was mentioned, the "stripes" can be configured in any desired fashion, including those that do not lend themselves to being represented graphically as stripes. Similarly, the present invention can be employed with any desired grouping of remembered sets. But the illustrated embodiment employs a particularly convenient grouping approach, one that, as will now be explained, is based on the assumption of a certain alignment and standardization among car sections.

For the sake of example, let us assume that a standard-sized car section is the 2 K bytes that each rectangle in FIG. 13's heap portion 212 represents. Let us further assume that the heap segments represented by those rectangles are so aligned that their starting addresses all end in eleven binary zeros. This does not mean that all car sections are of that size or are thus aligned. There are reasons, for instance, why the garbage collector may divide a standard-car-section-sized block into a plurality of small car sections, each of which is to contain only a single object. Also, some objects may be too large for a standard-sized car section. In such a case, we will assume that the collector combines a plurality of standard-car-section-sized segments to create a single-object car section to contain the large object.

Figure 15:
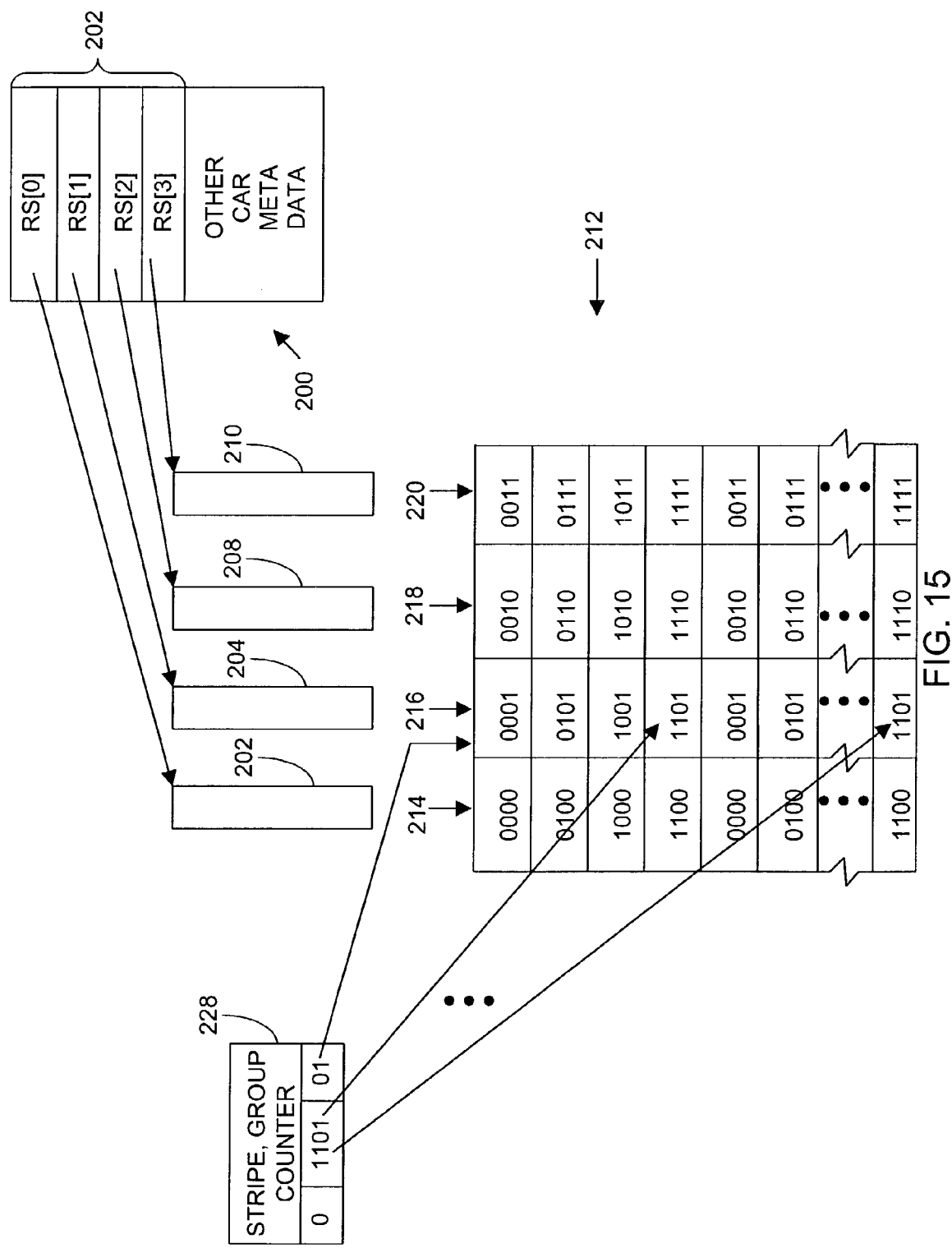
FIG. 15 is a data-structure diagram used to illustrate that embodiment.

Despite the resultant non-uniformity in car-section size, it is convenient to base remembered-set grouping on the standard car-section size, because doing so makes it possible for a bit combination in a referred-to object's address to identify the car-section group to which that object belongs. If we number address bits in a 32-bit machine from 0 for the least-significant bit to 31 for the most-significant bit, and if each car section is 2 $K=2^{11}$ bytes in size and aligned as described above, then any combination of bits at least as significant as bit 11 defines a grouping. For the sake of simplicity, let us say that the bits selected for this purpose are bits 11 through 14. Each of these sixteen possible values that those four bits together can represent is associated with a different group of cars (and thus remembered sets). And any object that begins in a memory region that FIG. 15 represents by a rectangle containing a given number is considered to be located in the same car-section group, as any other object that begins in that memory region or any other memory region represented by a rectangle containing the same number.

So a way of claiming a combination of stripe and car-section (and therefore remembered-set) group is again to increment a counter atomically. In FIG. 15, the two least-significant bits in seven-bit counter 228 can identify the stripe in that combination, while the next four bits identify the remembered-set group. When a thread needs to claim a combination of stripe and remembered-set group, it atomically increments that counter by employing, say, a compare-and-swap operation. If the compare-and-swap operation does not succeed, the thread merely repeats it until either (1) the atomic operation succeeds or (2) the count reaches sixty-four, which indicates all combinations have already been claimed.

FIG. 14's block 230 represents determining whether the counter reached that terminal value before the atomic operation succeeded. If it did, then the routine returns; updating has been completed. Otherwise, the thread begins reading the card-table entries associated with the cards in the stripe that it has thus claimed. As blocks 232, 234, and 236 indicate, this continues until the thread either finds a dirty card or runs out of cards in the current stripe.

When it does encounter a dirty card, it determines for each reference in that card whether the object thereby referred to is located in the car-section group it has claimed. It does this simply by comparing bits 11 through 14 of the reference with that car-section group's number. Blocks 238, 240, and 242 indicate that the thread makes this determination for every reference in the card but makes corresponding remembered-set entries only if the referred-to object is in the selected car-section group.

This means that, in contrast to the approach based only on stripes, this approach, which is based on combinations of stripes and remembered-set groups, requires that each stripe be scanned as many times as there are remembered-set groups. But the cost of this repeated scanning will usually be only a small fraction of the updating operation's cost, because that operation includes inserting values into the remembered sets, and that involves searching the remembered-set structure to find open slots and avoid duplication. So the resultant improvement in load-balancing performance will often justify the (typically modest) cost of scanning each stripe more than once.

Moreover, that cost can be reduced by using a system for keeping track of the group ranges in which referred-to objects are located. For example, the collector can maintain a range table containing a respective entry for, say, each of the heap divisions that the drawing rectangles represent. At the beginning of the dirty-card-scanning operation, each entry's initial value indicates that the corresponding heap division has not been scanned. When the next card reached in the step represented by FIG. 14's block 234 is in a new heap region, the thread reads the corresponding entry in the range table to determine whether that region has already been scanned.

If that region has not been scanned yet, the thread enters a mode in which it keeps track of the car-group range occupied by the objects in that region's references and writes an indicator of that range in the entry. Specifically, when a thread that is in this mode encounters a reference at the block-238 step, it compares the group number of the car section containing the referred-to object with upper- and lower-range values in the range-table entry for the region currently being scanned. If that group number is above or below that range, it adjusts the upper- or lower-range value accordingly.

On the other hand, if the thread's reading of the range-table entry before the block-234 step reveals that the region has already been scanned, the thread determines whether the range identified by the range-table entry includes the car-section group the thread has claimed. If it does not, the thread skips that region and proceeds to the next region, if any, in the claimed stripe.

Of course, the range table does not have to be organized in accordance with regions whose sizes are those that the rectangles represent. The range-table region for which a given entry is kept could instead be only a card, for example, or a whole stripe.

This approach of using the first thread through a region to perform a once-per-region operation can also be used to record references into other generations. Consider, for example, the example, the two-generation organization described above. The young generation is typically small enough that little benefit results from dividing among multiple threads the task of recording the locations of references to young-generation objects. So the first thread to scan a region can record not only the locations of references into its claimed car group but also those of references into the young generation.

As was stated above, the data structure used to list the locations of such references to young-generation objects may be an expanded card table. In some such card tables, an entry does double duty: the reference-location summaries are normally written over the dirty/clean indicators. So, when the reference-recording approach of FIG. 14 is used in such systems, the first thread through should not immediately place the summary in the expanded-card-table slot; doing so would prevent subsequent threads from finding that that card dirty. It should instead place it initially into a temporary, "shadow" table, where it remains until all threads that need to scan the summarized card have done so. When the scanning is finished, the shadow table's entries are transferred into the card table.

Although it is convenient to employ the above-described approach of basing the definitions of structure groups on stripes and groups of remembered sets, and in turn of basing stripe and remembered-set-group definitions on selected bits of the reference location and contents, respectively, the present invention is not restricted to that approach. In principle, any other grouping approach would work, too. If the approach of using selected reference-address bits to define stripes is used in a system in which the mutator employs a card table to record reference modifications, though, it is preferable for the bits used for this purpose to be so selected that each of the (typically multiple) continuous address sequences that make up a given stripe begin and end on card boundaries. Suppose that the card size is 512 bytes, for instance. Whereas any selection of reference-address bytes can be employed for the stripe definition, it is best for all bits employed for this purpose to be at least as significant as bit 9 ($2^9$=512).

If the bit-selection approach to remembered-set- (and car-) group definition is employed, restrictions need to be imposed on the selection of bits in the reference value, too. For example, suppose that the standard car-section size is 2 K bytes. If a bit less significant than bit 11 ($2^{11}$=2K) is employed, two threads scanning the same stripe could end up writing concurrently to the same constituent remembered-set structure and potentially interfere with other's update operations. Restricting the selection of bits on which the car-group definition is based to bits at least as significant as bit 11 guarantees that such interference will not occur.

This is true in the illustrated embodiment even though some car sections may be considerably larger than the 2 K-byte standard car-section size. As was mentioned above, such car sections in the illustrated embodiment are all single-object sections, provided to contain respective single large objects. So there will be only a single object address that maps to such a car, even though the range of location addresses in the car section spans more than the two kilobytes in a standard-car-section-sized segment.

Whereas FIGS. 13 and 15 depict a single car-metadata structure 200 as containing an array 202 of pointers to non-contiguous remembered-set structures, this arrangement is merely exemplary. As those skilled in the art are aware, the metadata structure employed for a car can actually consist of a number of constituent, non-contiguous structures. Conversely, a given car's various constituent structures employed to store the remembered-set entries for different stripes can actually all be contiguous. It is only necessary that the constituent structures be treated as separate in the sense that making an entry in response to a reference located in a given stripe cannot result in the thread's writing in a constituent structure associated with a different stripe.

On the other hand, each of the constituent structures may itself be a composite of multiple non-contiguous structures. For example, they could be divided into structures respectively associated with different "substripes," as is described in commonly assigned co-pending U.S. patent application Ser. No.10/324,844 of Garthwaite for Binned Remembered Sets, which was filed the same day as this application, was assigned Cesari and McKenna docket number 112047-0088, and is hereby incorporated by reference.

So the present invention can be implemented in a wide range of embodiments and thus constitutes a significant advance in the art.

The invention claimed is:

1. For performing garbage collection, a method comprising:

A) providing a computer system that includes memory and executes a mutator that modifies references in a dynamically allocated heap in the memory;

B) configuring the computer system to act as a garbage collector that collects respective collection sets in collection increments and that:

i) divides at least a portion of the heap into reference stripes and remembered-set regions;

ii) maintains for each of the remembered-set regions a remembered set, associated therewith and stored in a plurality of remembered-set structures associated with that remembered-set region and with respective different ones of the reference stripes, by executing, in a plurality of concurrent update threads with each of which the garbage collector associates at any one time a different set of the remembered-set structures, a reference-recording operation in which the threads scan the reference stripes for references and each thread records in only the remembered-set structures of the set thereof currently associated therewith the locations of references thereby found;

iii) identifies potentially reachable objects in an operation that includes employing the remembered sets to identify potentially reachable objects in respective remembered-set regions; and iv) reclaims memory occupied by objects not thereby determined to be potentially reachable; and C) employing the computer system to execute the garbage collector.

2. A method as defined in claim 1 wherein each of the threads is associated at any one time with a different one of the reference stripes and records in only the remembered-set structures associated with the stripe currently associated with that thread the locations of references found thereby.

3. A method as defined in claim 2 wherein the number of stripes exceeds the number of threads and, if one or more stripes have not previously been claimed when a thread completes scanning a stripe, a stripe not previously claimed is claimed as the stripe associated with such a thread.

4. A method as defined in claim 1 wherein:

A) the remembered-set regions are divided into region groups;

B) at any one time each of the threads is associated with a different combination of region group and reference stripe; and C) each thread makes entries only in the remembered-set structures associated both with that reference stripe and with a remembered-set region belonging to that region group.

5. A method as defined in claim 4 wherein the number of combinations of stripes and region groups exceeds the number of threads and, if one or more such combinations have not previously been claimed when a thread completes scanning a stripe, a combination not previously claimed is claimed as the combination associated with such a thread.

6. A method as defined in claim 4 wherein:

A) the garbage collector divides the heap into a plurality of generations;

B) a first one of the generations is the portion of the heap that the garbage collector divides into reference stripes and remembered-set regions; and C) the first thread to scan a stripe additionally records against a second of the generations the locations in that stripe of references to objects in the second generation.

7. A method as defined in claim 4 wherein:

A) the garbage collector divides the heap portion into range-table regions, with each of which it associates a respective range-table entry;

B) each range-table region is contained entirely within a single stripe;

C) the first thread to scan a range-table region gives the associated range-table entry a range value representing a range in which all objects in the heap portion that are referred to by references in that range-table region are located; and D) while a given thread is currently associated with a stripe that includes a range-table region with which another thread has thus associated a range value that excludes the region group with which the given thread is currently associated, the given thread refrains from scanning that range-table region.

8. A computer system comprising:

A) processor circuitry operable to execute processor instructions; and

B) memory circuitry, to which the processor circuitry is responsive, that contains processor instructions readable by the processor circuitry to configure the computer system to operate as a garbage collector that:

i) divides into reference stripes and remembered-set regions at least a portion of a dynamically allocated heap in the memory;

ii) maintains for each of the remembered-set regions a remembered set, associated therewith and stored in a plurality of remembered-set structures associated with that remembered-set region and with respective different ones of the reference stripes, by executing, in a plurality of concurrent update threads with each of which the garbage collector associates at any one time a different set of the remembered-set structures, a reference-recording operation in which the threads scan the reference stripes for references and each thread records in only the remembered-set structures of the set thereof currently associated therewith the locations of references thereby found;

iii) identifies potentially reachable objects in an operation that includes employing the remembered sets to identify potentially reachable objects in respective remembered-set regions; and iv) reclaims memory occupied by objects not thereby determined to be potentially reachable.

9. A computer system as defined in claim 8 wherein each of the threads is associated at any one time with a different one of the reference stripes and records in only the remembered-set structures associated with the stripe currently associated with that thread the locations of references found thereby.

10. A computer system as defined in claim 9 wherein the number of stripes exceeds the number of threads and, if one or more stripes have not previously been claimed when a thread completes scanning a stripe, a stripe not previously claimed is claimed as the stripe associated with such a thread.

11. A computer system as defined in claim 8 wherein:

A) the remembered-set regions are divided into region groups;

B) at any one time each of the threads is associated with a different combination of region group and reference stripe; and C) each thread makes entries only in the remembered-set structures associated both with that reference stripe and with a remembered-set region belonging to that region group.

12. A computer system as defined in claim 11 wherein the number of combinations of stripes and region groups exceeds the number of threads and, if one or more such combinations have not previously been claimed when a thread completes scanning a stripe, a combination not previously claimed is claimed as the combination associated with such a thread.

13. A computer system as defined in claim 11 wherein:

A) the garbage collector divides the heap into a plurality of generations;

B) a first one of the generations is the portion of the heap that the garbage collector divides into reference stripes and remembered-set regions; and C) the first thread to scan a stripe additionally records against a second of the generations the locations in that stripe of references to objects in the second generation.

14. A computer system as defined in claim 11 wherein:

A) the garbage collector divides the heap portion into range-table regions, with each of which it associates a respective range-table entry;

B) each range-table region is contained entirely within a single stripe;

C) the first thread to scan a range-table region gives the associated range-table entry a range value representing a range in which all objects in the heap portion that are referred to by references in that range-table region are located; and D) while a given thread is currently associated with a stripe that includes a range-table region with which another thread has thus associated a range value that excludes the region group with which the given thread is currently associated, the given thread refrains from scanning that range-table region.

15. A storage medium containing instructions readable by a computer system that includes memory to configure the computer system to operate as a garbage collector that:

A) divides into reference stripes and remembered-set regions at least a portion of a dynamically allocated heap in the memory;

B) maintains for each of the remembered-set regions a remembered set, associated therewith and stored in a plurality of remembered-set structures associated with that remembered-set region and with respective different ones of the reference stripes, by executing, in a plurality of concurrent update threads with each of which the garbage collector associates at any one time a different set of the remembered-set structures, a reference-recording operation in which the threads scan the reference stripes for references and each thread records in only the remembered-set structures of the set thereof currently associated therewith the locations of references thereby found;

C) identifying potentially reachable objects in an operation that includes employing the remembered sets to identify potentially reachable objects in respective remembered-set regions; and D) reclaims memory occupied by objects not thereby determined to be potentially reachable.

16. A storage medium as defined in claim 15 wherein each of the threads is associated at any one time with a different one of the reference stripes and records in only the remembered-set structures associated with the stripe currently associated with that thread the locations of references found thereby.

17. A storage medium as defined in claim 16 wherein the number of stripes exceeds the number of threads and, if one or more stripes have not previously been claimed when a thread completes scanning a stripe, a stripe not previously claimed is claimed as the stripe associated with such a thread.

18. A storage medium as defined in claim 15 wherein:
A) the remembered-set regions are divided into region groups;
B) at any one time each of the threads is associated with a different combination of region group and reference stripe; and
C) each thread makes entries only in the remembered-set structures associated both with that reference stripe and with a remembered-set region belonging to that region group.

19. A storage medium as defined in claim 18 wherein the number of combinations of stripes and region groups exceeds the number of threads and, if one or more such combinations have not previously been claimed when a thread completes scanning a stripe, a combination not previously claimed is claimed as the combination associated with such a thread.

20. A storage medium as defined in claim 18 wherein:
A) the garbage collector divides the heap into a plurality of generations;
B) a first one of the generations is the portion of the heap that the garbage collector divides into reference stripes and remembered-set regions; and
C) the first thread to scan a stripe additionally records against a second of the generations the locations in that stripe of references to objects in the second generation.

21. A storage medium as defined in claim 18 wherein:
A) the garbage collector divides the heap portion into range-table regions, with each of which it associates a respective range-table entry;
B) each range-table region is contained entirely within a single stripe;
C) the first thread to scan a range-table region gives the associated range-table entry a range value representing a range in which all objects in the heap portion that are referred to by references in that range-table region are located; and
D) while a given thread is currently associated with a stripe that includes a range-table region with which another thread has thus associated a range value that excludes the region group with which the given thread is currently associated, the given thread refrains from scanning that range-table region.

22. A garbage collector operating in the memory of a computer and comprising:
A) means for dividing into reference stripes and remembered-set regions at least a portion of a dynamically allocated heap in a computer system's memory;
B) means for maintaining for each of the remembered-set regions a remembered set, associated therewith and stored in a plurality of remembered-set structures associated with that remembered-set region and with respective different ones of the reference stripes, by executing, in a plurality of concurrent update threads with each of which the garbage collector associates at any one time a different set of the remembered-set structures, a reference-recording operation in which the threads scan the reference stripes for references and each thread records in only the remembered-set structures of the set thereof currently associated therewith the locations of references thereby found;
C) means for identifying potentially reachable objects in an operation that includes employing the remembered sets to identify potentially reachable objects in respective remembered-set regions; and
D) means for reclaiming memory occupied by objects not thereby determined to be potentially reachable.

* * * * *